United States Patent
Nakatsugawa et al.

(10) Patent No.: US 8,738,016 B2
(45) Date of Patent: May 27, 2014

(54) SCHEDULING METHOD, WIRELESS BASE STATION, AND WIRELESS TERMINAL

(75) Inventors: Keiichi Nakatsugawa, Kawasaki (JP); Junichi Suga, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 399 days.

(21) Appl. No.: 12/793,299

(22) Filed: Jun. 3, 2010

(65) Prior Publication Data
US 2010/0238895 A1 Sep. 23, 2010

Related U.S. Application Data

(63) Continuation of application No. PCT/JP2007/073388, filed on Dec. 4, 2007.

(51) Int. Cl.
*H04W 16/02* (2009.01)
*H04W 16/12* (2009.01)

(52) U.S. Cl.
CPC ................................ *H04W 16/12* (2013.01)
USPC ....................... 455/447; 370/458; 370/468

(58) Field of Classification Search
USPC .............. 370/229, 232–234, 310, 395.4, 458, 370/464, 465, 468, 477; 455/422.1, 446, 455/447
See application file for complete search history.

(56) References Cited

U.S. PATENT DOCUMENTS

| | | | |
|---|---|---|---|
| 6,031,831 A * | 2/2000 | Tan Boon et al. | 370/342 |
| 7,072,315 B1 * | 7/2006 | Liu et al. | 370/329 |
| 7,477,914 B2 * | 1/2009 | Jalil et al. | 455/524 |
| 7,512,097 B2 * | 3/2009 | Jelitto et al. | 370/329 |
| 2002/0098799 A1 * | 7/2002 | Struhsaker et al. | 455/3.05 |
| 2002/0119781 A1 | 8/2002 | Li et al. | |
| 2002/0147017 A1 | 10/2002 | Li et al. | |
| 2003/0125040 A1 * | 7/2003 | Walton et al. | 455/454 |

(Continued)

FOREIGN PATENT DOCUMENTS

| | | |
|---|---|---|
| JP | 2004159345 | 6/2004 |
| JP | 2004187247 | 7/2004 |

(Continued)

OTHER PUBLICATIONS

IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1 IEEE Std 802.16e-2005 and IEEE Std 802.16-2004/Cor1-2005.

IEEE Standard for Local and metropolitan area networks Part 16: Air Interface for Fixed Broadband Wireless Access Systems IEEE Std 802.16-2004.

(Continued)

*Primary Examiner* — Edan Orgad
*Assistant Examiner* — Curtis A Alia
(74) *Attorney, Agent, or Firm* — Smith, Gambrell & Russell, LLP

(57) ABSTRACT

A wireless base station for performing wireless communication with a wireless terminal using a frequency bandwidth different from another adjacent wireless base station in a first time period and performing wireless communication with a wireless terminal using a frequency bandwidth shared with another adjacent wireless base station in a second time period and including a control unit that does not change a burst profile to be applied to an uplink transmission or assigns a burst profile corresponding to a wireless transmission rate equal to or less than a wireless transmission rate corresponding to an applied burst profile with respect to a wireless terminal used for wireless communication in the first time period.

18 Claims, 26 Drawing Sheets

(56) References Cited

U.S. PATENT DOCUMENTS

| | | |
|---|---|---|
| 2003/0169681 A1 | 9/2003 | Li et al. |
| 2004/0097238 A1* | 5/2004 | Hwang et al. ............... 455/447 |
| 2005/0105483 A1* | 5/2005 | Uehara et al. ............... 370/315 |
| 2005/0259629 A1* | 11/2005 | Oliver et al. ............... 370/345 |
| 2006/0039346 A1* | 2/2006 | Shapiro ............... 370/349 |
| 2006/0063543 A1* | 3/2006 | Matoba et al. ............... 455/509 |
| 2006/0203713 A1* | 9/2006 | Laroia et al. ............... 370/209 |
| 2007/0155377 A1 | 7/2007 | Horiguchi et al. |
| 2008/0039129 A1* | 2/2008 | Li et al. ............... 455/522 |
| 2010/0067471 A1 | 3/2010 | Matsuzawa |

FOREIGN PATENT DOCUMENTS

| | | |
|---|---|---|
| JP | 2007174337 | 7/2007 |
| WO | 0249385 A2 | 6/2002 |
| WO | 2006126616 A1 | 11/2006 |
| WO | 2008111224 A1 | 9/2008 |

OTHER PUBLICATIONS

Mobile WiMAX—Part I: A Technical Overview and Performance Evaluation Aug. 2006.
International Search Report dated Apr. 22, 2008 in corresponding International application No. PCT/JP2007/073388.

* cited by examiner cinr: CINR WHICH IS TO BE
CRITERION OF RECEPTION

| MS | TRANSMISSION POWER |
|---|---|
| MS1 | Tp1 |
| MS2 | Tp2 |
| MS3 | Tp3 |
| MS4 | Tp4 |

TRANSMISSION POWER IN ASCENDING ORDER

FIG.14B
| BURST PROFILE (MODULATION SCHEME/FEC) | CINR AT RECEIVING BS (dB) |
|---|---|
| QPSK1/2 | 6 |
| 16QAM1/2 | 12 |
| 64QAM1/2 | 18 |
FIG.14C
| THRESHOLD TRANSMISSION POWER AT R3 (dBm) |
|---|
| 20 |
FIG.14A
| MS | TRANSMISSION POWER (dBm) |
|---|---|
| MS1 | 3 |
| MS2 | 4 |
| MS3 | 5 |
| MS4 | 6 |
| MS5 | 8 |
| MS6 | 9 |
| MS7 | 15 |
| MS8 | 20 |
(1)
(3)
(2)

FIG.16B

| BURST PROFILE (MODULATION SCHEME/FEC) | CINR AT RECEIVING BS (dB) |
|---|---|
| QPSK1/2 | 6 |
| 16QAM1/2 | 12 |
| 64QAM1/2 | 18 |

FIG.16A

| MS | TRANSMISSION POWER (dBm) | MAXIMUM TRANSMISSION POWER OF MS (dBm) |
|---|---|---|
| MS1 | 3 | 25 |
| MS2 | 4 | 30 |
| MS3 | 5 | 22 |
| MS4 | 6 | 20 |
| MS5 | 8 | 20 |
| MS6 | 9 | 20 |
| MS7 | 15 | 30 |
| MS8 | 20 | 25 |

FIG.21A

| MS  | TRANSMISSION POWER (dBm) |
|-----|--------------------------|
| MS1 | 3                        |
| MS2 | 4                        |
| MS3 | 5                        |
| MS4 | 6                        |
| MS5 | 8                        |
| MS6 | 9                        |
| MS7 | 15                       |
| MS8 | 20                       |

FIG.21B

| BURST PROFILE (MODULATION SCHEME/FEC) | CINR AT RECEIVING BS (dB) |
|---------------------------------------|---------------------------|
| QPSK1/2                               | 6                         |
| 16QAM1/2                              | 12                        |
| 64QAM1/2                              | 18                        |

FIG.21C

| THRESHOLD TRANSMISSION POWER AT R1 (dBm) |
|------------------------------------------|
| 10                                       |

FIG.21D

| THRESHOLD TRANSMISSION POWER AT R3 (dBm) |
|------------------------------------------|
| 20                                       |

FIG.23A

| MS | TRANSMISSION POWER (dBm) | MAXIMUM TRANSMISSION POWER OF MS (dBm) |
|---|---|---|
| MS1 | 3 | 25 |
| MS2 | 4 | 30 |
| MS3 | 5 | 22 |
| MS4 | 6 | 20 |
| MS5 | 8 | 20 |
| MS6 | 9 | 20 |
| MS7 | 15 | 30 |
| MS8 | 20 | 25 |

FIG.23B

| BURST PROFILE (MODULATION SCHEME/FEC) | CINR AT RECEIVING BS (dB) |
|---|---|
| QPSK1/2 | 6 |
| 16QAM1/2 | 12 |
| 64QAM1/2 | 18 |

FIG.23C

| THRESHOLD TRANSMISSION POWER AT R1 (dBm) |
|---|
| 10 |

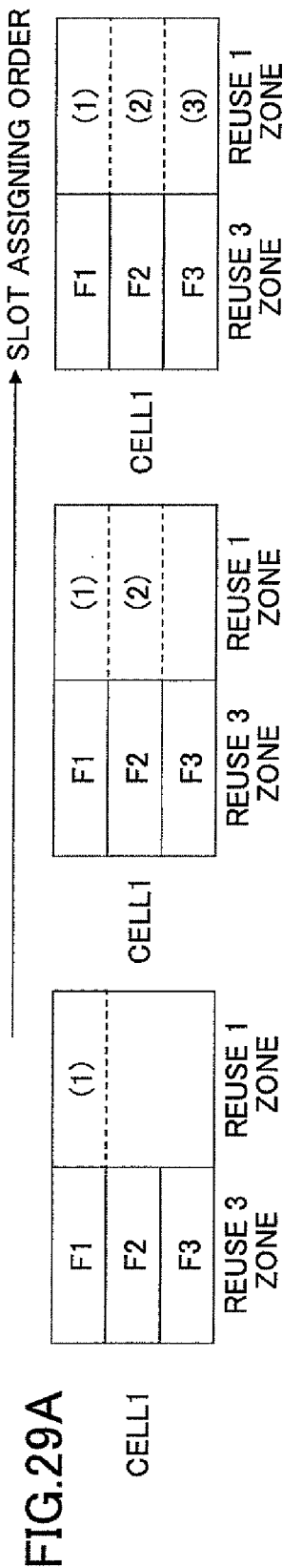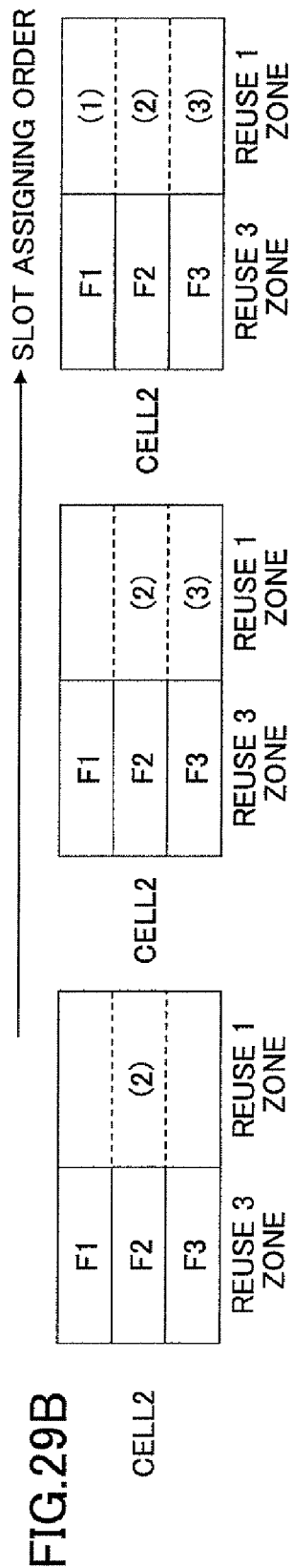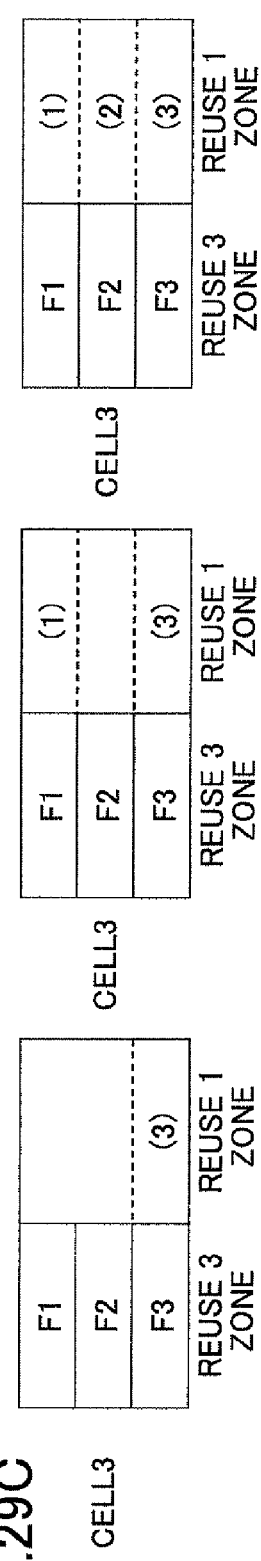

SCHEDULING METHOD, WIRELESS BASE STATION, AND WIRELESS TERMINAL

CROSS-REFERENCE TO RELATED APPLICATIONS

This application is based upon and claims the benefit of priority of International Patent Application No. 2007-073388 filed on Dec. 4, 2007, the entire contents of which are incorporated herein by reference.

FIELD

The embodiments discussed herein are related to a scheduling method of wireless resources in a wireless communication system including a wireless base station and plural wireless terminals and to a wireless base station and a wireless terminal using thereof.

BACKGROUND

One wireless communication technology that is drawing attention in recent years is the IEEE 802.16. As an alternative of, for example, telephone lines and optical fiber lines, IEEE 802.16 has been developed as a method of building a Wireless MAN (Metropolitan Area Network) which is a wide area network for wirelessly connecting carriers and a user's home and connecting between LANs (Local Area Network) of urban areas and specific areas. IEEE 802.16 can cover an area having a radius of approximately 50 km with a maximum transmission rate of approximately 70 megabits/second.

Currently, in the IEEE 802.16 working group, a 802.16d specification (see non-patent document 1) for fixed communications and a 802.16e specification (see non-patent document 2) for mobile communications are mainly being standardized.

In the WiMAX (Worldwide Interoperability for Microwave Access) Forum which is an organization for ensuring connection among communication devices and systems based on the 802.16d/e specifications, a FFR (Fractional Frequency Reuse) is proposed as one form of reusing wireless frequencies of a wireless communication system based on 802.16d/e (see non-patent document 3).

In one representative example of reusing frequencies used by each cell in a wireless communication system, there is a 3 frequency repetition method (hereinafter referred to as "Reuse 3") of dividing available frequencies F1, F2, F3 into three parts and exclusively using each frequency at cell 1, cell 2, and cell 3 (as illustrated in FIG. 1). As another example, there is a 1 frequency repetition method (hereinafter referred to as "Reuse 1") of allowing shared use of available frequencies with each cell (as illustrated in FIG. 2).

In a case where of further dividing each cell into 3 sectors, the same can be said where a cell is replaced with a sector. Nevertheless, the below-description uniformly uses the term "cell".

In a case where available frequencies are the same, the maximum throughput of each cell with Reuse 1 is 3 times compared to that of Reuse 3. On the other hand, in terms of the influence of interference among the cells, the cell 1, for example, receives interference from adjacent cells (cell 2 and cell 3) because Reuse 1 allows each cell to use the same frequency. Particularly, a wireless terminal (hereinafter referred to as MS (Mobile Station)) is affected greater the closer to a boundary area between cells.

On the other hand, with Reuse 3, the cell 1, for example, is unaffected by interference because adjacent cells 2 and 3 use different frequencies. In a case where there is cell 1' (not illustrated) having cell 2 interposed between cell 1 and using a preceding frequency F1, the attenuation of interference waves from the cell 1' becomes greater towards the cell 1 because the cell 1' is located farther compared to adjacent cells 2 and 3. Thus, the influence of interference is significantly smaller compared to that of Reuse 1. That is, with Reuse 1, a MS located in the vicinity of a cell boundary experiences degradation of channel quality and difficulty in communicating due to interference waves from adjacent cells. Therefore, coverage of the MS becomes small with Reuse 1. Reuse 3, however, faces no such problems. Therefore, coverage of the MS can be expanded.

With the above-described FFR, adjacent base stations use different frequencies at a first time period but are allowed to share a frequency in a second time period. In this example, by combining the advantages of Reuse 1 and Reuse 3, a wide coverage as Reuse 3 can be maintained while throughput of the entire system is improved to be as close as possible to that of the Reuse 1.

FIG. 3 illustrates an example of an uplink sub-frame of an OFDMA wireless frame in a case where FFR is applied. Although control data regions such as a preamble, a FCH (Frame Control Header), a DL-MAP, a UL-MAP exist in the frame in a case of IEEE 802.16d/e, the control data regions are omitted from this drawing.

Further, although the frame is divided in a downlink (downward direction from a wireless base station to a wireless terminal) sub-frame and an uplink (upward direction from a wireless terminal to a wireless base station) sub-frame in a case of TDD (Time Division Duplexing), only a single configuration is illustrated for the sake of simplification. The horizontal axis represents a time direction with symbols serving as units (modulation is performed once for a single symbol), and the vertical axis represents a frequency direction with sub-channels serving as units (frequency group formed of plural sub-carriers). As illustrated in FIG. 3, the sub-frame can be divided into two parts in the time direction, for example. One may be used as a Reuse 3 zone and the other may be used as a Reuse 1 zone. In the Reuse 3 zone, an available sub-channel is divided into three parts F1, F2, F3 in the frequency direction and is used exclusively in 3 cells. In the Reuse 1 zone, the sub-channel is shared. The manner in which frequencies of cells 1-3 are used in this state is illustrated with FIG. 4. In the time period using Reuse 3, the cells 1, 2, and 3 each exclusively use F1, F2, and F3 and can cover an MS located in the vicinity of a cell boundary. In the time period using Reuse 1, an MS is mainly located in the vicinity of a center of a cell at which communication can be performed even where there is interference from adjacent cells.

Non-patent document 1: IEEE Std 802.16™-2004
Non-patent document 2: IEEE Std 802.16e™-2005
Non-patent document 3: Mobile WiMAX—Part I: A Technical Overview and Performance Evaluation (August 2006).

With the above-FFR, it is possible to achieve wide coverage and high throughput. Further, FFR can be applied to a downlink from a wireless base station (hereinafter referred to as "BS" (Base Station) to a MS and to an uplink from a MS to a BS. Particularly, a special control region is required to be provided in the uplink of IEEE 802.16d/e for feedback data and contention access from the MS to the BS. To that extent, available resources for enabling user data transmission of the MS decrease. Therefore, it is an important task to improve throughput more in the uplink than the downlink.

However, in a case of applying FFR to the uplink, the following problems arise. In a case of the uplink, a MS which is located far from a cell center requires to transmit uplink wireless signals with large transmission power even in a case where a Burst Profile (a transmission parameter indicating a combination of a modulation scheme and an encoding scheme, hereinafter referred to as "BP") used for transmitting uplink data is the same. Even for MS having the same distance from a cell center, a large transmission power is required in order to use a high speed BP for transmitting large amounts of uplink data. In a case of a downlink, a base station, which is the source of transmitting wireless signals, is located significantly apart from other base stations. Further, a MS located in the vicinity of a cell center is less likely to be affected by interference from adjacent cells even with Reuse 1. Therefore, wireless channel quality of the base station is relatively high. Thus, downlink data can be transmitted using high speed BP.

On the other hand, in a case of an uplink, a MS, which is the source of transmitting wireless signals, tends to have a short distance with respect to a base station(s) other than the base station performing wireless communications with the MS when compared with the distances between base stations. Further, the faster BP is used by the MS, the greater transmission power becomes. To that extent, interference to adjacent cells using the same frequency becomes greater.

FIG. 5 illustrates the manner in which interference occurs during uplink frame transmission. MS1 and MS2 are connected to cell 1 and cell 2, respectively. The distance away from the cell center (BS) is greater for MS2. In this example, MS1 and MS2 both use Reuse 1 for communicating with each other. MS1 uses QPSK 1/2 (a modulation scheme of QPSK, an encoding scheme having error correction code percentage of 50%). MS2 uses 16 QAM 1/2 (a modulation scheme of 16 QAM, an encoding scheme having error correction code percentage of 50%).

MS2 is located farther from the BS (counterpart) compared to MS1. Further, MS2 uses a high speed BP. Therefore, MS2 needs to transmit uplink wireless signals with greater transmission power. Accordingly, the transmission signals of MS2 travels to adjacent cells 1 and 3 in the form of interference waves. Thereby, in a case where a BS of cell 1 receives transmission signals from a MS1 which also uses Reuse 1, the reception quality of the MS1 is degraded. In a case of the uplink, degradation of wireless channel quality occurs, and throughput of the entire system decreases.

SUMMARY

An embodiment of the present invention provides a wireless base station for performing wireless communication with a wireless terminal using a frequency bandwidth different from another adjacent wireless base station in a first time period and performing wireless communication with a wireless terminal using a frequency bandwidth shared with another adjacent wireless base station in a second time period, including a control unit that does not change a burst profile to be applied to an uplink transmission or assigns a burst profile corresponding to a wireless transmission rate equal to or less than a wireless transmission rate corresponding to an applied burst profile with respect to the wireless terminal used for wireless communication in the first time period.

BRIEF DESCRIPTION OF DRAWINGS

FIG. 14 is a diagram for describing a scheduling procedure according to a first embodiment of the present invention;

FIG. 16 is a diagram for describing a scheduling procedure according to a second embodiment of the present invention;

FIG. 21 is a diagram for describing a scheduling procedure according to a third embodiment of the present invention;

FIG. 23 is a diagram for describing a scheduling procedure according to a third embodiment of the present invention;

FIG. 29 is a diagram for describing a modified example of a slot assigning method in Reuse 1 zone of an uplink sub-frame according to the first through fourth embodiments of the present invention.

DESCRIPTION OF EMBODIMENT(S)

Next, embodiments of the present invention are described with reference to the drawings.

Figure 1:
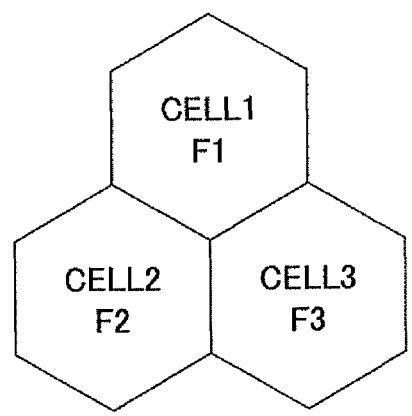
FIG. 1 is a diagram for describing a 3 frequency repetition method.
Figure 2:
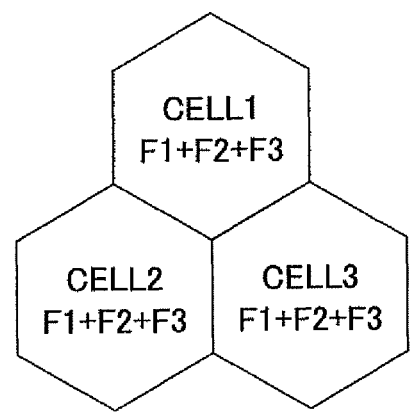
FIG. 2 is a diagram for describing a 1 frequency repetition method.
Figure 3:
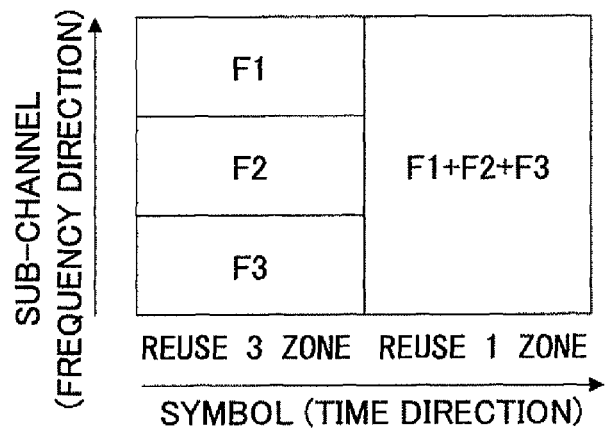
FIG. 3 is a diagram illustrating an example of an uplink sub-frame of a OFDMA wireless frame in a case where FFR is applied.
Figure 4:
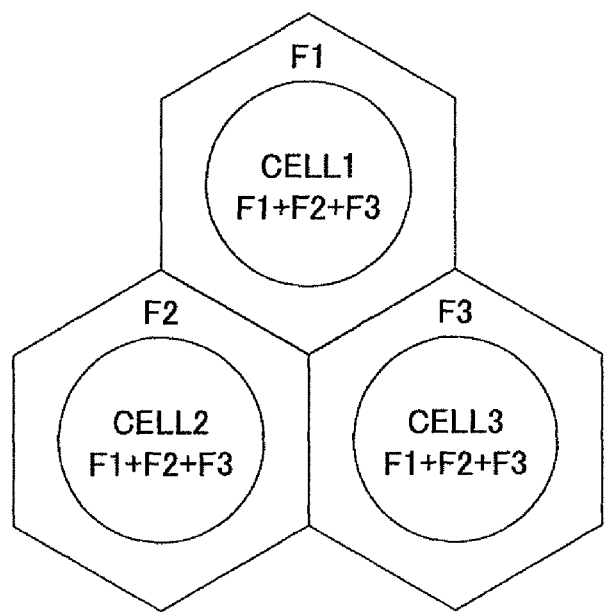
FIG. 4 is a diagram illustrating a manner in which frequency reuse is used according to FFR.
Figure 5:
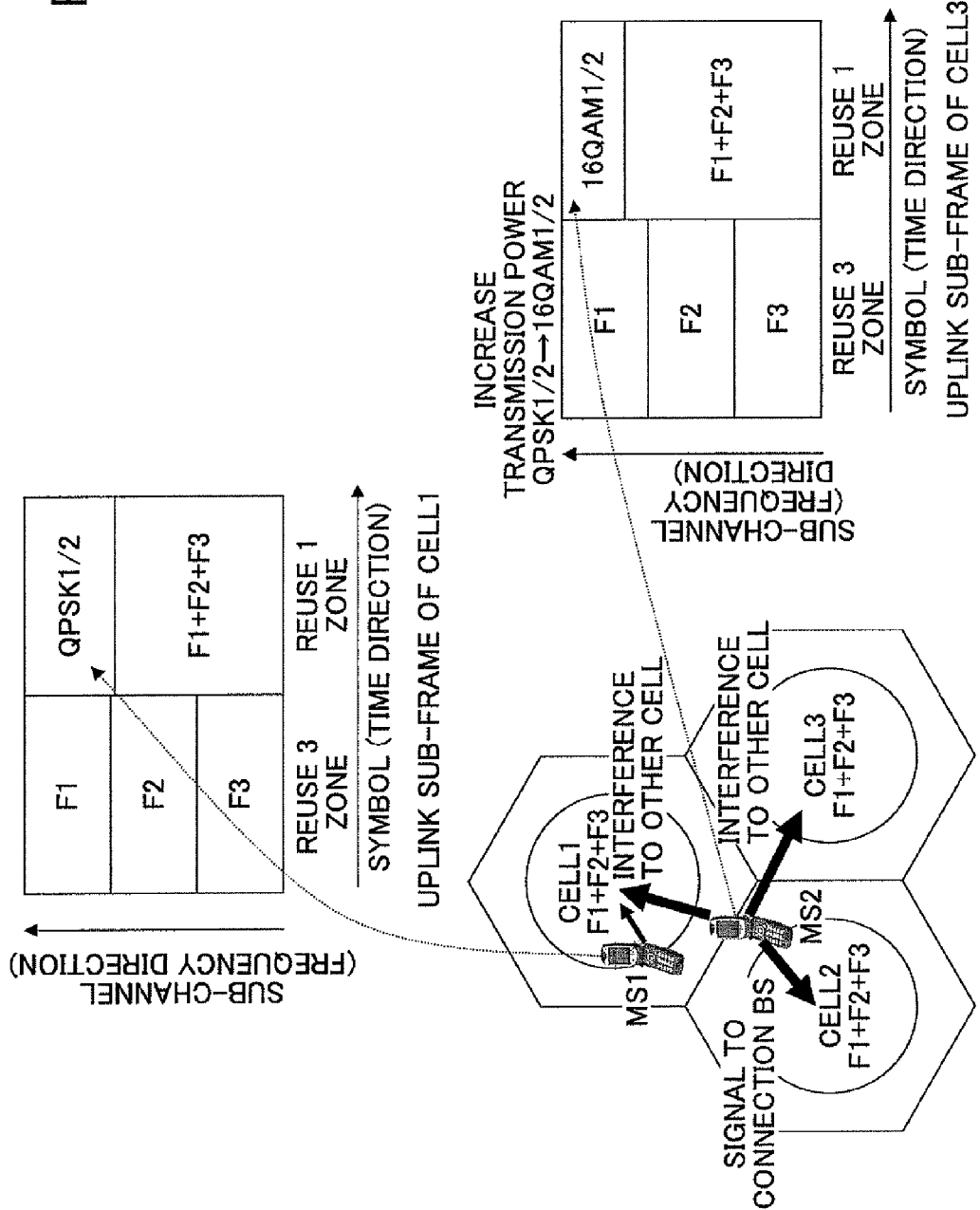
FIG. 5 is a diagram illustrating a manner in which interference occurs during uplink frame transmission.
Figures 6, 7:
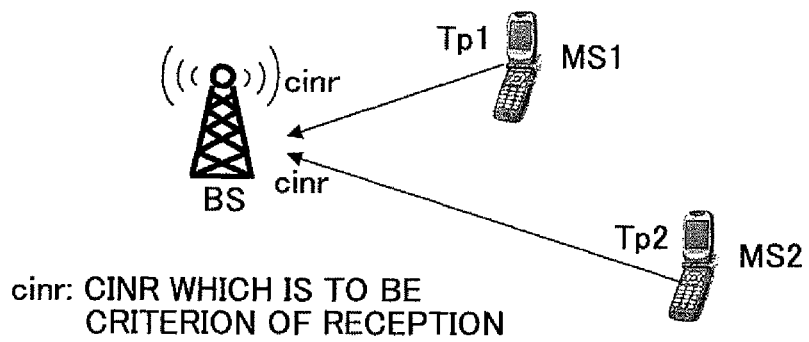
FIG. 6 is a diagram for describing adjustment of transmission power.
FIG. 7 is a diagram illustrating a correspondence data between MS and transmission power of the MS.

As illustrated in FIG. 6, BS and each MS in this embodiment perform transmission power control at a time of initial connection or at certain periods. The BS receives signals transmitted from each MS and measures wireless channel quality (e.g., CINR (Carrier to Interference and Noise Ratio). The BS instructs increase/decrease of transmission power of transmission signals to each MS so that reception CINR is equal to or less than a predetermined value (hereinafter referred to as "cinr"). The predetermined reception CINR is, for example, CINR satisfying a predetermined error rate (e.g., $10^{-1}$) in a case where a slow but error resistant BPSK or QPSK 1/2 (encoding rate of 1/2) is used.

The transmission power of MS1 is controlled to Tp1 (in units of, for example, dBm) and the transmission power of MS2 is controlled to Tp2. The reception qualities for both are "cinr" at the BS. By adjusting the transmission power of each MS, the BS can grasp a correspondence between the MS and transmission power as illustrated in FIG. 7.

Figure 8:
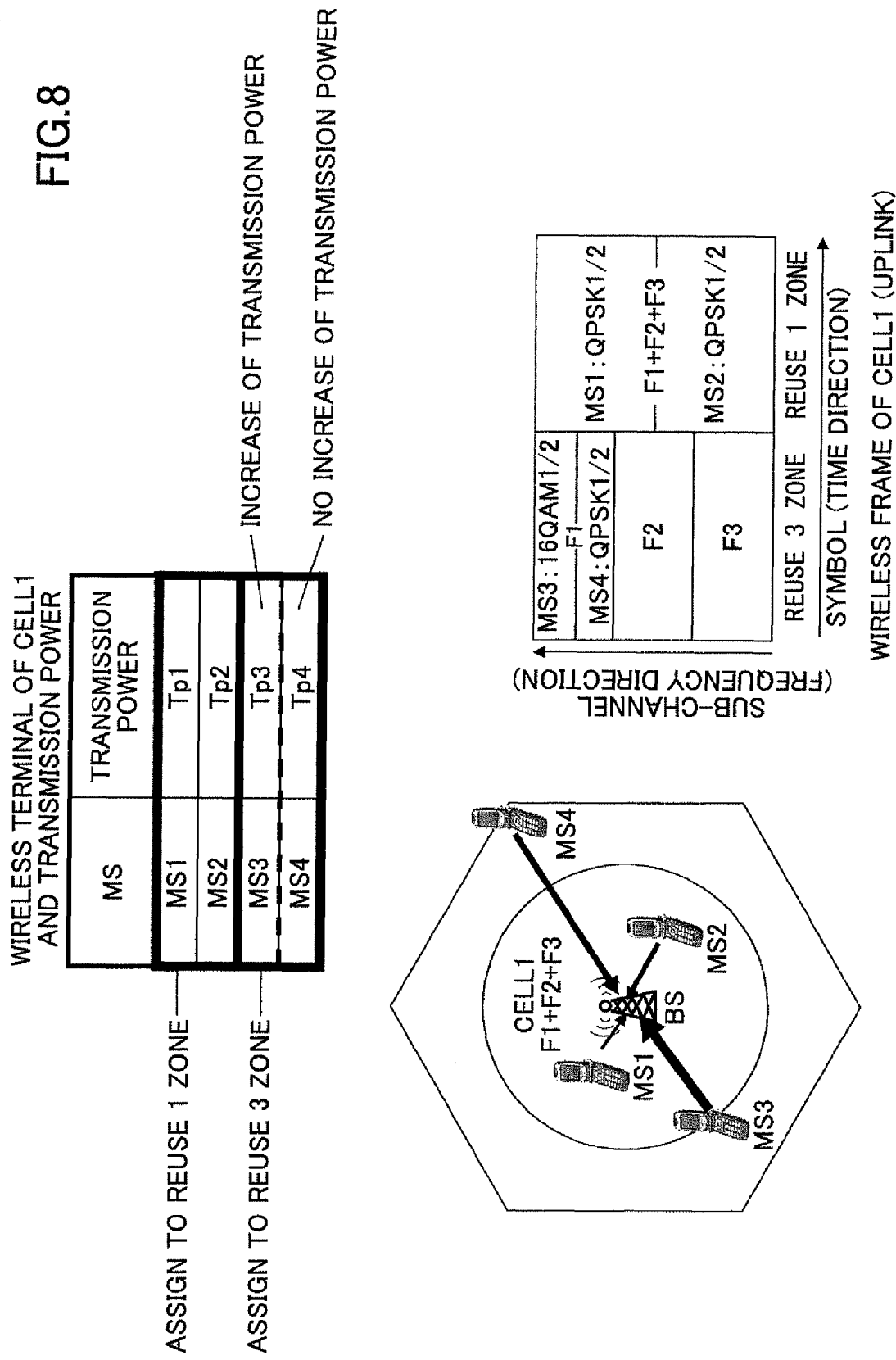
FIG. 8 is a diagram for describing a first scheduling method according to an embodiment of the present invention.

FIG. 8 is for describing a first scheduling method.

First, wireless resources of the uplink frame are assigned from Reuse 1 zone to the MS in an order starting from the MS having the lowest transmission power. A wireless resource is a slot of a frame (also referred to as "block") defined by, for example, n symbols×m sub-channels. The assigning is performed by calculating the number of necessary slots in a case of using a low transmission parameter BP (e.g., QPSK 1/2) capable of being used with low transmission power. In FIG. 8, wireless resources of Reuse 1 zone are assigned to a MS1 and a MS2. It is to be noted that even if wireless resources of Reuse 1 zone is once assigned to a MS, transmission power increases the farther from the BS due to the above-described controlling of transmission power. In a case where the transmission power increases beyond a predetermined threshold, wireless resources of Reuse 3 are assigned.

Then, wireless resources of Reuse 3 zone are assigned to MS that have not yet been assigned with a wireless resource. In this process, in order to take advantage that Reuse 3 is less susceptible to interference from adjacent cells, it is determined whether a faster BP can be used. If a predetermined condition(s) is satisfied, assigning of wireless resources is performed using a high speed BP (e.g., 16 QAM 1/2) instead of QPSK 1/2.

The following exemplary cases are conditions for using high speed BP.
1) A case of being able to apply a BP faster than QPSK 1/2 by increasing transmission power of the MS to a predetermined threshold (fixed value) determined by considering the transmission power of the MS or interference to two preceding cells using the same frequency.
2) A case of being able to apply a BP faster than QPSK 1/2 by increasing transmission power of the MS to a maximum transmission power that is permissible for performance of each MS.

In both cases, when there are plural MS satisfying the conditions, wireless resources are assigned to a MS capable of using a faster BP (for example, in a case where there is a MS capable of using 64 QAM 1/2 and a MS capable of using 16 QAM, the former) or MS capable of using the same BP in an order starting from a MS requiring less transmission power for using the BP. In FIG. 8, only MS 3 satisfy the above conditions.

Accordingly, wireless resources of Reuse 3 using a faster 16 QAM 1/2 are assigned to MS3, and wireless resources of Reuse 3 using QPSK 1/2 are assigned to MS4.

It is to be noted that, it is preferable not to change the BP or change the already assigned BP to a faster one with respect to a MS already assigned to Reuse 1 zone.

Further, wireless transmission rate of a MS already assigned to Reuse 1 zone can be controlled so that the BP assigned to the uplink has a wireless transmission rate equal to or less than that of the BP assigned to the downlink. For example, in a case where QPSK is assigned to the downlink, QPSK can be assigned to the uplink instead of 16 QAM. Further, in a case where 16 QAM is assigned to the downlink, wireless transmission rate can be controlled so that either 16 QAM or QPSK can be applied to the uplink.

In FIG. 8, the maximum rate of the burst profile for Reuse 1 zone can be controlled to QPSK 1/2, and the maximum rate of the burst profile for Reuse 3 zone can be controlled to 16 QAM 1/2 (faster than QPSK 1/2). Thereby, a mechanism of preventing interference to the uplink of the Reuse 1 zone (susceptible to interference) can be introduced.

Further, the MS assigned with Reuse 1 zone can be controlled so that transmission power is not increased. In this case, the transmission power can be controlled to be equal to or less than a maximum transmission power.

A second scheduling method is described with reference to FIG. 9. The adjustment of transmission power performed at a time of initial connection or periodically is substantially the same as that of the first scheduling method.

First, wireless resources of the uplink sub-frame are assigned to the MS in an order starting from the MS having the smallest transmission power. In this process, it is determined whether a faster BP is to be used in a case where the transmission power does not surpass a predetermined threshold. If a predetermined condition(s) is satisfied, assigning of wireless resources is performed using a BP faster than QPSK 1/2. The threshold indicates a limit transmission power for enabling interference to adjacent cells to be controlled to a level so low that it is ignorable even with the Reuse 1, and is the maximum transmission power in a case where the Reuse 1 zone is used. In other words, in a case where the MS is located comparatively close to the BS and requires a small amount of transmission power for using QPSK 1/2, the MS can increase the transmission power to the threshold when wireless resources of the Reuse 1 zone are assigned to the MS.

Figure 9:
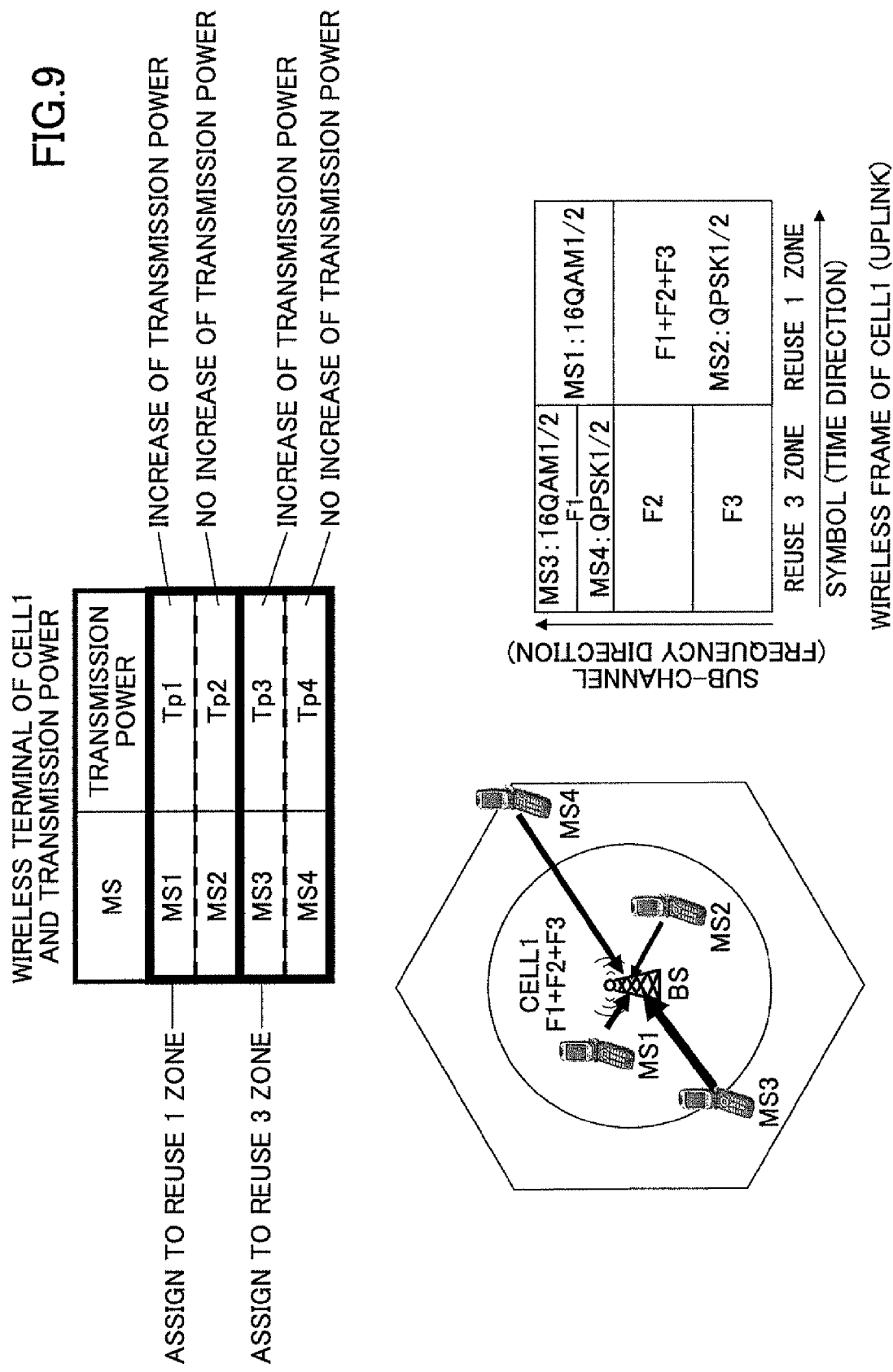
FIG. 9 is a diagram for describing a second scheduling method according to an embodiment of the present invention.

In FIG. 9, only MS 1 satisfies the above-described conditions. The wireless resources of Reuse 1 zone are assigned to the MS1 using a faster 16 QAM 1/2. The wireless resources of Reuse 1 zone are assigned to MS2 using QPSK 1/2.

It is to be noted that the assigning of wireless resources of Reuse 3 zone is substantially the same as that of assigning wireless resources of Reuse 3 zone using the first scheduling method. In FIG. 9, only MS3 satisfies the above-described conditions. The wireless resources of Reuse 3 zone are assigned using a faster 16 QAM 1/2. The wireless resources of Reuse 3 zone are assigned to MS4 using QPSK 1/2.

Figure 10:
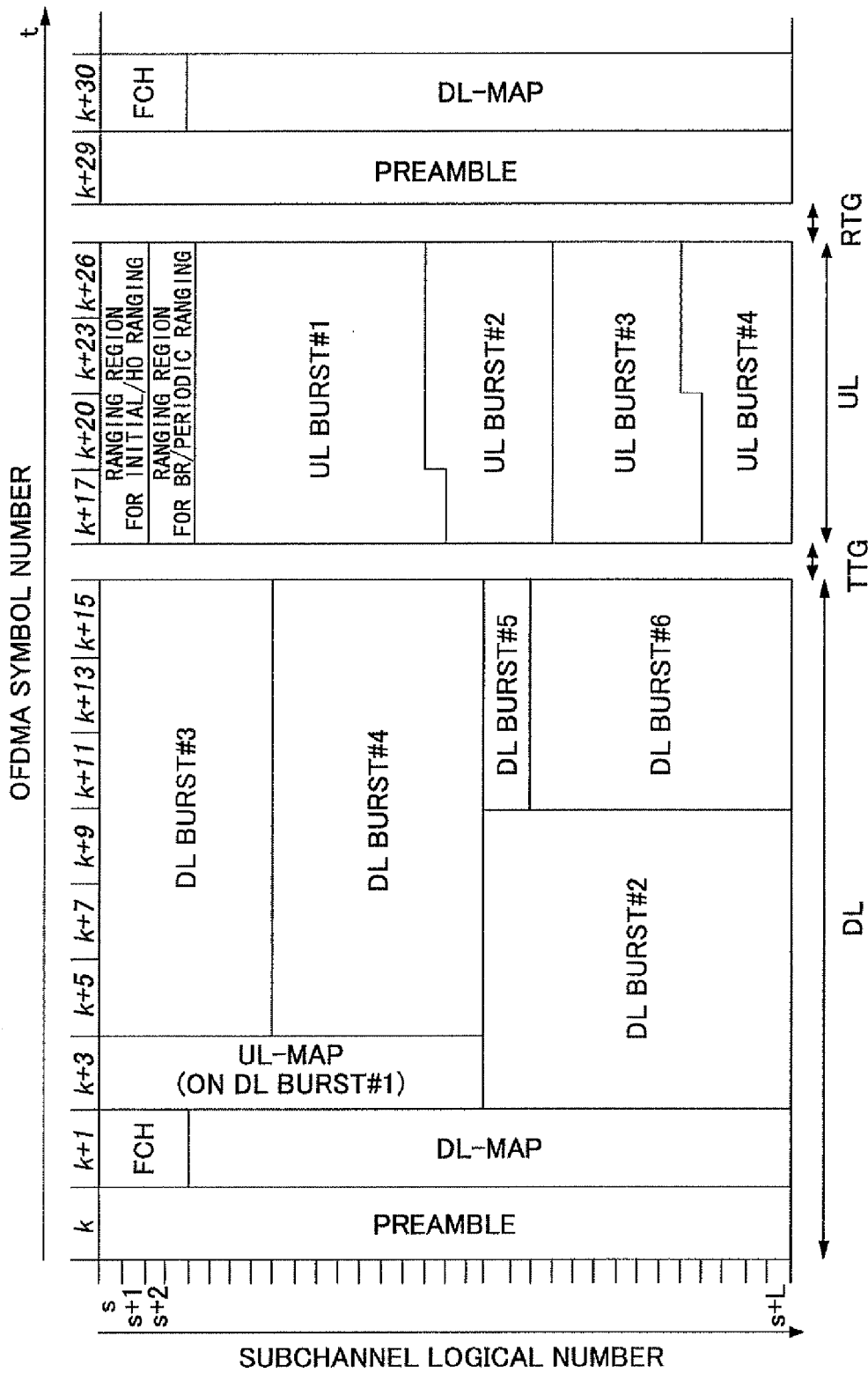
FIG. 10 is a diagram illustrating an exemplary configuration of an OFDMA wireless frame.

FIG. 10 illustrates an exemplary configuration of an OFDMA wireless frame. In FIG. 10, the horizontal axis indicates a OFDMA symbol number and points to a time axis direction. The vertical axis indicates a sub-channel logical number.

The OFDMA frame includes a downlink sub-frame, an uplink sub-frame, a TTG (Transmit/Receive Transition Gap), and a RTG (Receive/Transmit Transition Gap).

The downlink sub-frame includes a preamble, a FCH, a DL-MAP, a UL-MAP, and plural DL burst. The preamble includes a preamble pattern required for enabling a wireless terminal to establish frame synchronization. The FCH includes data pertaining to a sub-channel to be used or a subsequent DL-MAP. The DL-MAP includes mapping data of a DL burst of a DL sub-frame. By receiving and analyzing the DL-MAP, the wireless terminal can identify the UL-MAP (transmit on DL burst#1) and the DL burst (#2-#6).

The UL-MAP includes data of a ranging region of a UL sub-frame and data of mapping of the UL burst. By reading the UL-MAP, a wireless terminal can identify the ranging region and the UL burst (#1-#4).

A burst includes allocated or assigned slots of the downlink sub-frame and the uplink sub-frame of a wireless frame. The burst is a region including combinations of same modulation schemes and same FEC (Forward Error Correction). The DL-MAP/UL-MAP designate the combination of the modulation scheme and the FEC of each burst.

The scheduling results by a wireless base station are sent to all wireless terminals using the DL-MAP set to the top of the DL sub-frame and the UL-MAP of each frame.

With the first and second scheduling methods, in a case where a high speed BP is selected, it is necessary to transmit wireless signals with greater transmission power than the transmission power controlled at the time of initial connection or at certain periods. In such a case, the BS may report the BP and the transmission power (absolute value or increased difference) or report only the BP, so that the MS can set transmission power based on data pertaining to BP and transmission power required to be increased in correspondence with the BP.

More specifically, with the first method, the BS sends an instruction to a corresponding MS to "increase Xdb (X is a given value)" by using a Power Control IE included in the data of a UL-MAP. The corresponding MS increases transmission power according to the instruction.

With the second method, the BS reports the number of assigned slots and BP to be used to the MS by using UL-MAP. In a case of a MS having the reported BP changed to a high speed BP, the MS determines how much db power is to be increased based on a correspondence table of BP and the reception C/N of the BS (described below in, for example, FIG. 14 (B) and autonomously increases the power.

Figure 11:
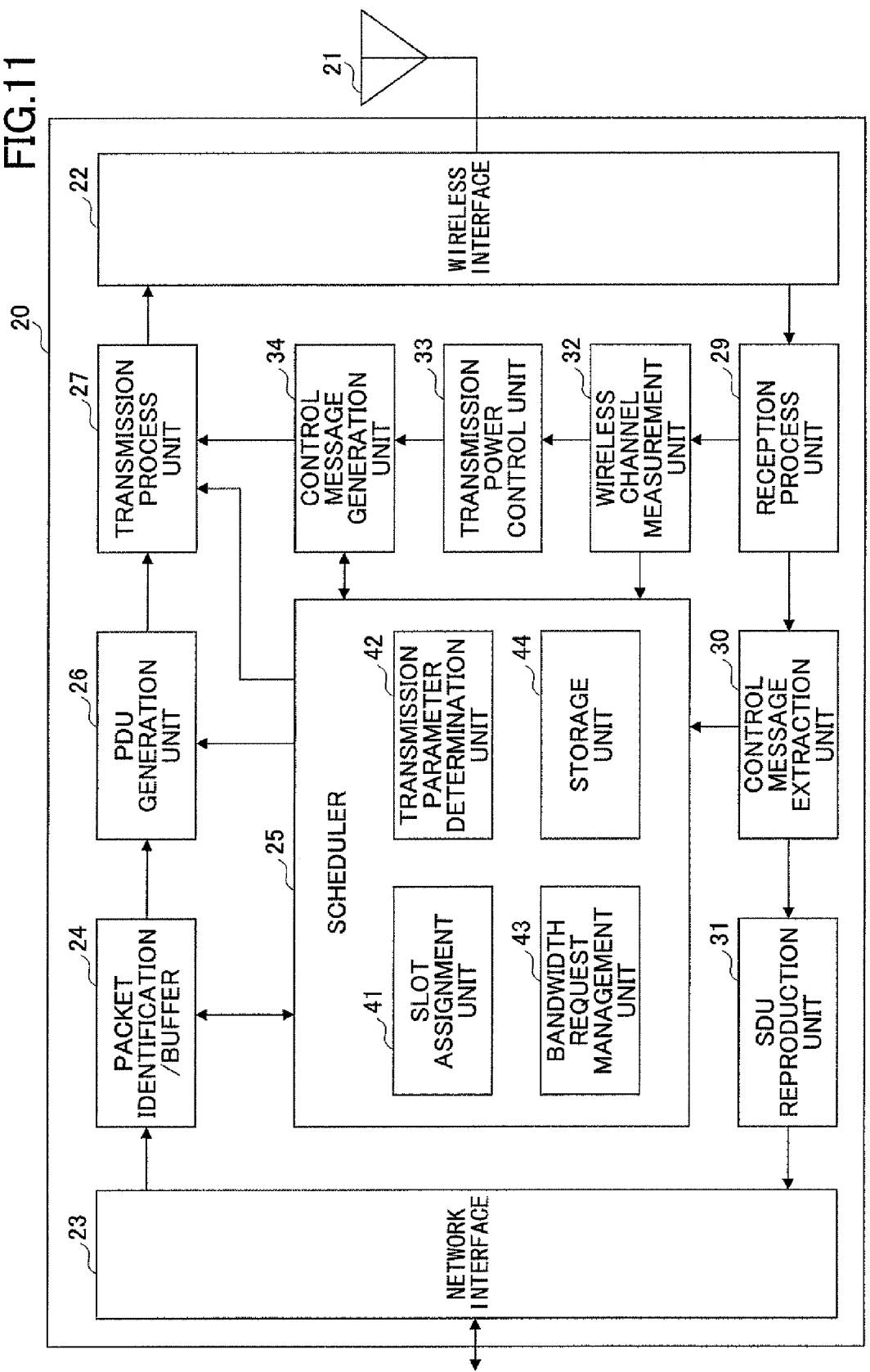
FIG. 11 is a diagram illustrating an exemplary configuration of a wireless base station according to an embodiment of the present invention.

FIG. 11 is a diagram illustrating a configuration of a wireless base station apparatus according to an embodiment of the present invention. In the drawing, a wireless base station apparatus 20 includes an antenna 21 for serving as a communication interface, a wireless interface 22 for transmitting and receiving wireless signals between the MS, and a network interface 23 for transmitting and receiving mainly packets between a router or the like (not illustrated).

A downlink packet received via the network interface 23 and bound to a MS is supplied to a packet identification/buffer unit 24, identified in units of MS and connection, and temporarily stored in a buffer serving as a SDU (Service Data Unit).

Then, after a slot(s) in a downlink sub-frame is assigned by a scheduler 25, the SDU output from the packet identification/buffer unit 24 is supplied to a PDU generation unit 26 to be subjected to SDU/PDU conversion (e.g., adding a MAC header or CRC, fragmentation, packing). Then, encoding, modulation, and wireless frame generation is performed on the PDU by the transmission process unit 27. Then, the wireless frame is converted into wireless signals and transmitted to the MS by the wireless interface 22.

An uplink signal received via the wireless interface 22 is subjected to reception frame extraction, demodulation, and decoding by a reception process unit 29, so that PDU in an uplink sub-frame can be extracted. Then, a control message extraction unit 30 sorts control messages and user data.

In a case where the uplink PDU is user data, an SDU reproduction unit 31 performs PDU/SDU conversion (de-fragmentation, de-packing, removal of MAC header or CRC) on the uplink PDU. Then, the network interface 23 transfers the user data to a superordinate network.

Data such as transmission power or maximum transmission power of the MS or an uplink bandwidth request for transmitting user data from the MS are extracted as a control message by the control message extraction unit 30. Then, the control message is supplied to the scheduler 25 to be used for scheduling. The above-described setting and controlling of burst profiles can be performed by selection and controls of burst profiles by the scheduler (control unit) 25. The content of what to be controlled has been described above.

Further, the measurement and adjustment of an uplink CINR of each MS is performed by a wireless channel measurement unit 32, a transmission power control unit 33, and a control message generation unit 34. The wireless channel measurement unit 32 calculates parameters pertaining to wireless channel quality such as uplink CINR and RSSI from signals received from the MS via the reception process unit 29. The transmission power control unit 33 determines a correction value for increasing or reducing transmission power of the MS so that the uplink CINR calculated by the wireless channel measurement unit 32 becomes a predetermined CINR. It is to be noted that the transmission power can be controlled so that transmission power for a wireless terminal of a Reuse 1 zone is not increased or so that the transmission power is equal to or less than a maximum transmission power. The control message generation unit 34 generates a control message (REP-REQ according to IEEE 802.16d/e) and requests transmission to the scheduler 25 for reporting the correction value determined by the transmission power control unit 33 to the MS.

The scheduler 25 determines assignment and allocation of uplink sub-frames and downlink sub-frames of a wireless frame for downlink user data and control messages to the MS and uplink user data and control messages from the MS. As described above, a group and allocation of assigned slots is referred to as a burst according to IEEE 802.16 d/e. The DL-MAP and the UL-MAP are generated as map data of the burst for the downlink sub-frame and the uplink sub-frame, respectively. That is, the scheduler 25 controls the wireless resources used for transmission and reception by controlling the map data.

The PDU generation unit 26 and the transmission process unit 27 generate a downlink sub-frame based on the DL-MAP. All MS receive the UL-MAP as a downlink control message. Based on the data of the UL-MAP, each MS transmits uplink user data and control messages by using the slots assigned thereto.

In order to perform the above-described scheduling, the scheduler 25 includes a slot assignment unit 41, a transmission parameter determination unit 42, a bandwidth request management unit 43, and a storage unit 44.

The storage unit 44 stores data to be referred during scheduling such as transmission power and maximum transmission power in the control message from the MS, the thresholds of transmission power in Reuse 1 and Reuse 3 zones, correspondence data between CINR and usable transmission parameter (BP), and configuration data (e.g., sizes of the downlink sub-frame and the uplink sub-frame, sizes and allocation of the Reuse 1 and Reuse 3 zones).

The bandwidth request management unit 43 manages bandwidth requests and sizes thereof waiting to be transmitted with respect to connection of each MS based on a request messages from the MS or autonomous assignment by the BS. The data of the waiting bandwidth requests are updated whenever a new request is generated or whenever assignment is performed by scheduling.

The transmission parameter determination unit 42 determines the modulation scheme and the encoding scheme to be used (this combination of is referred to as BP (Burst Profile) in IEEE 802.16d/e) based on transmission power and wireless channel quality of the MS and the amount of bandwidth requests waiting to be transmitted.

The slot allocation unit 41 determines the MS allowed to use the slot of the Reuse 1 and Reuse 3 zones and the number of slots to be assigned to the MS based on the unassigned bandwidth requests managed by the bandwidth request management unit 43, usable transmission parameters of each MS determined by the transmission parameter determination unit 42, and wireless frame configuration data.

First Embodiment

No Increase of Transmission Power of MS in Reuse 1 Zone, Increase of Transmission Power of MS to Threshold in Reuse 3

Figure 12:
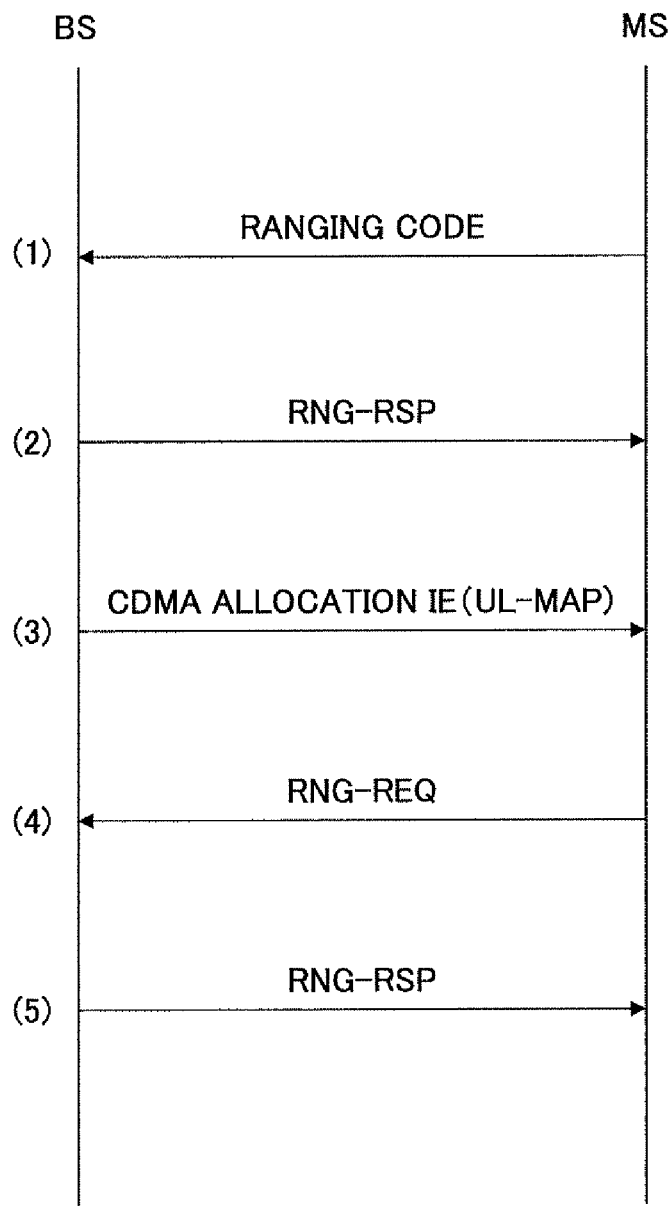
FIG. 12 is a diagram illustrating a ranging procedure for performing transmission power adjustment at an initial connection time or at certain periods.

FIG. 12 illustrates a ranging procedure for adjusting transmission power at an initial connection or at certain periods according to IEEE 802.16d/e. The parenthesis in the drawing corresponds to the following description.
(1) The MS selects Initial Ranging Code (at the time of initial ranging) or Periodic Ranging Code (at the time of periodic ranging) and transmits the selected ranging code by using a given slot (ranging opportunity) in a CDMA Ranging Region set to a UL sub-frame.
(2) The BS receives the ranging code from the MS and measures the timing of the reception signal and communication quality (CINR) upon receiving the ranging code. In a case where correction is necessary, the BS transmits a RNG-RSP message as a response including timing adjust data or power level adjust data indicating the value of the correction.
(3) Then, the BS sets CDMA Allocation IE to a UL-MAP serving as an assignment map data of the uplink sub-frame and assigns a slot(s) in the uplink sub-frame for allowing the MS to transmit a RNG-REQ of (4).
(4) The MS transmits the RNG-REQ message by using the slot assigned in the CDMA Allocation IE of (3). In transmitting the message, the transmission using the assigned slot is performed after correction is performed according to the transmission power and timing reported in (2). The RNG-REQ message includes, for example, a MAC address and a MAC version (IEEE 802.16d or IEEE 802.16e).
(5) The BS performs measurement of the timing of the reception signal and the reception quality again on the RNG-REQ from the MS and determines whether the RNG-REQ is received at a timing of a designated slot and received with a desired reception quality. In a case where the determination is affirmative, a RNG-RSP (Status indicating Success) including, for example, a Basic CID (Channel Identifier indicating the controlling channel of the MS to be used hereafter) is transmitted to the MS. In a case where correction of the reception timing or transmission power is required again, the BS transmits RNG-RSP including correction value data to the MS and instructs the MS to transmit a RNG-REQ again.

By the above-described ranging procedure, the transmission power of the MS can be controlled so that the BS can receive signals from the MS at a predetermined CINR.

Figure 13:
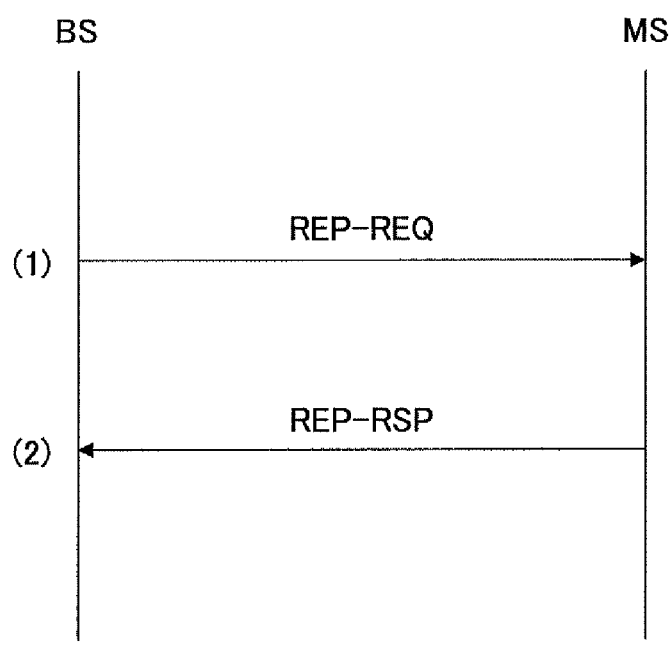
FIG. 13 is a diagram illustrating a measurement data reporting procedure for reporting measurement data.

FIG. 13 illustrates a measurement data reporting procedure for reporting measurement data pertaining to wireless channel quality from the MS to the BS according to IEEE 802.16d/e. The parenthesis in the drawing corresponds to the following description.

(1) The BS transmits a REP-REQ message to the MS to request the MS to report data pertaining to wireless channel quality. The REP-REQ message includes a Report type parameter enabling designation of the type of data to be reported. For example, in a case of requesting a report of the current transmission power value of the MS, bit 7 (Include current Tx power report) is set to 1.
(2) The MS transmits a REP-RSP message to report data regarding the item designated by the REP-REQ. The transmission power value is reported in a range of −64 through 43.5 dBm (by 0.5 dBm) using Current Tx power TLV of 1 byte.

With the above-described measurement data reporting procedure, the BS can be notified of the amount of transmission power of the MS at that time.

Figure 15:
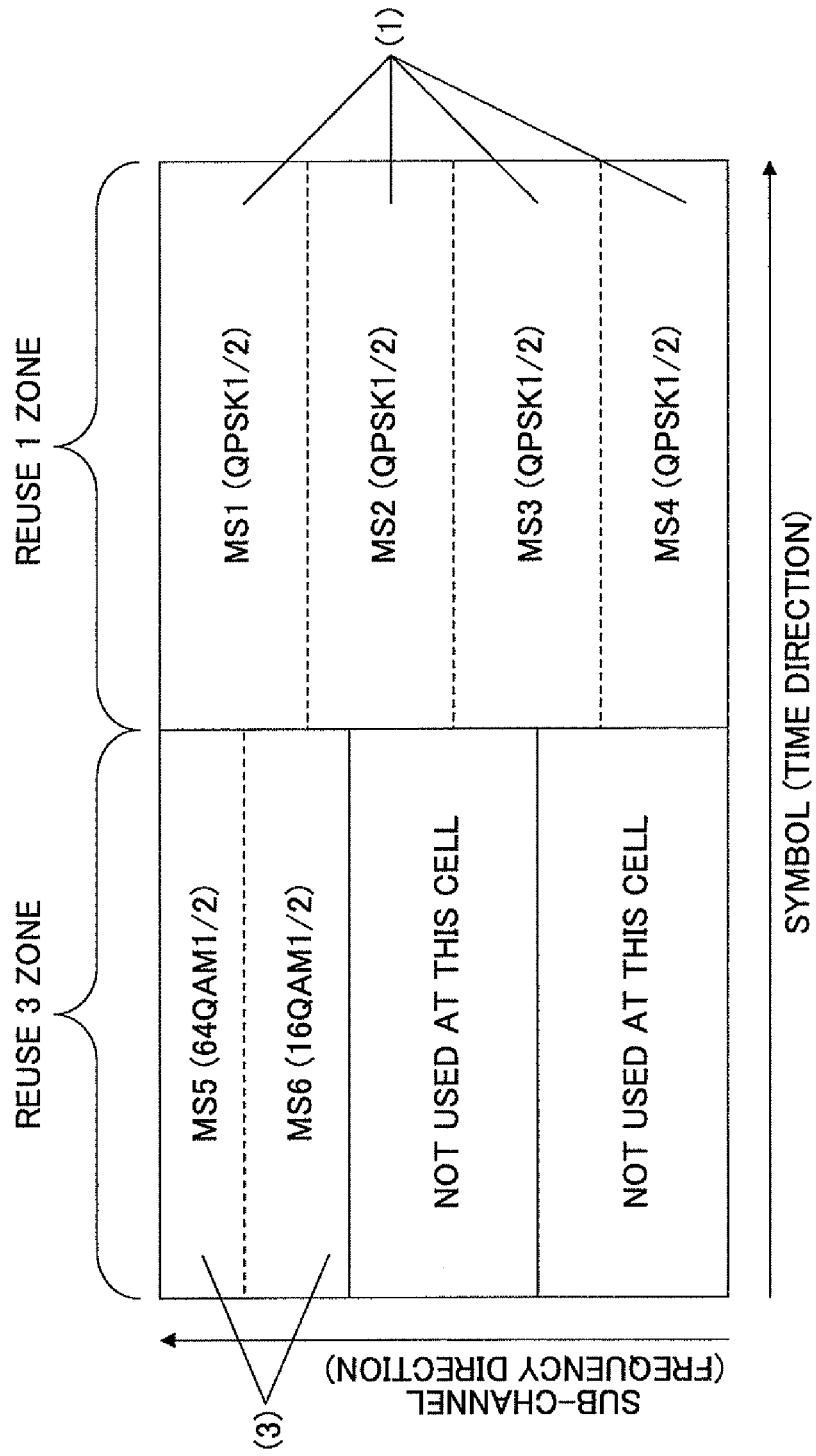
FIG. 15 is a diagram illustrating a wireless resource assignment result of an uplink sub-frame.

A scheduling procedure according to a first embodiment of the present invention is described with reference to FIG. 14. FIG. 15 illustrates results of allocating wireless resources of an uplink sub-frame in a case of this scheduling procedure. The parenthesis in the drawing corresponds to the following description.

In this embodiment, the BS adjusts transmission power of MS1 through MS8 so that a predetermined CINR of 6 dB is attained with QPSK 1/2. By using the procedure of FIG. 13, the BS is informed of the current transmission power value of each MS in a manner illustrated in FIG. 14 (A).

Further, the BS maintains transmission parameters BP in correspondence with the CINR required for attaining an uplink burst with the corresponding BP. FIG. 14 (B) illustrates that the required CINR for using QPSK 1/2, 16 QAM 1/2, 64 QAM 1/2 is 6 dB, 12 dB, and 18 dB, respectively. From another point of view, this signifies that the CINR is required to be 6 dB (12−6) higher in a case of transmitting an uplink burst of, for example, 16 QAM 1/2 compared to a case of transmitting an uplink burst of QPSK 1/2. Thus, transmission power of transmission signals (carrier waves) is to be increased in order to increase CINR.

It is to be noted that the type of BP, which is a combination of a modulation scheme and an encoding scheme, could be defined differently from that described above. Further, the corresponding data between the BP and the reception CINR could be maintained not only in the BS but also in the MS.

Further, the BS maintains threshold data of transmission power of the MS using Reuse 3 zone as illustrated in FIG. 14(C). Although the threshold in this embodiment is 20 dBm, an operator that provides services in a wireless communications system or a vendor of a base station can set the threshold.

Although the uplink sub-frame illustrated in FIG. 15 is an OFDMA frame used in IEEE 802.16e, feedback data from the MS to the BS and a control region for performing contention access are omitted for the sake of simplification. Further, IEEE 802.16d/e defines permutation such as PUSC, Optional PUSC, FUSC (downlink only), and Band AMC. The number of sub-carriers for data, the number of sub-carriers for pilot signals, and the number of sub-carriers forming a sub-channel are different depending on permutation. With PUSC, FUSC, the order of the logical sub-carrier index does not correspond to the order of the physical sub-carrier frequency. On the other hand, with Band AMC, the order of the logical sub-carrier index corresponds to the order of the physical sub-carrier frequency, and a sub-channel is formed of consecutive sub-carriers provided on the frequency axis.

Although the percentage of encountering interference of wireless signals transmitted from adjacent cells using the same slot is anticipated to be different depending on the type of permutation, the advantages obtained by the scheduling according to an embodiment of the present invention can be obtained using any type of permutation. Therefore, in the uplink sub-frame illustrated in FIG. 15, Reuse 1 zone and Reuse 3 zone may use any type of permutation, respectively.

(1) The BS assigns slots of Reuse 1 zone of an uplink frame by using QPSK 1/2 (as the BP usable with a predetermined CINR) in an order starting from the MS whose current transmission power is lowest. The BS performs slot allocation by managing the uplink data bandwidth yet to be assigned in byte units according to procedures such as bandwidth requests and calculating the necessary number of slots based on the BP to be used. In this example, as illustrated in FIG. 15, slots in Reuse 1 zone are assigned using QPSK 1/2 to MS1 through MS4. Thus, all slots of Reuse 1 zone are assigned.

(2) In a case where there are MS with bandwidth requests waiting for assignment, the BS selects the MS to which slots are assigned by using Reuse 3 zone. The BS determines whether a BP faster than QPSK 1/2 can be used in a case where transmission power is increased within the limit of a threshold 20 dBm in an order starting from the unassigned MS5. In this embodiment, the usable fastest BP for each MS is described below.

MS5: Because 20−8=12 dB, QPSK 1/2 is changed to 64 QAM 1/2 (increased amount: 18−6=12 dB).
MS6: Because 20−9=11 dB, QPSK 1/2 is changed to 16 QAM 1/2 (increased amount: 12−6=6 dB).
MS7: Because 20−15=5 dB, QPSK 1/2 can only be used.
MS8: Because 20−20=0 dB, QPSK 1/2 can only be used.

(3) Based on the above-determination, the BS uses a high speed BP as much as possible in an order starting from MS5 and assigns slots of Reuse 3 zone of the uplink sub-frame. In this example, MS5 and MS6 are assigned with slots of Reuse 3 zone using 64 QAM 1/2 and 16 QAM 1/2 as illustrated in FIG. 15. With all slots of Reuse 3 zone having been assigned, the scheduling is completed.

Second Embodiment

Figure 17:
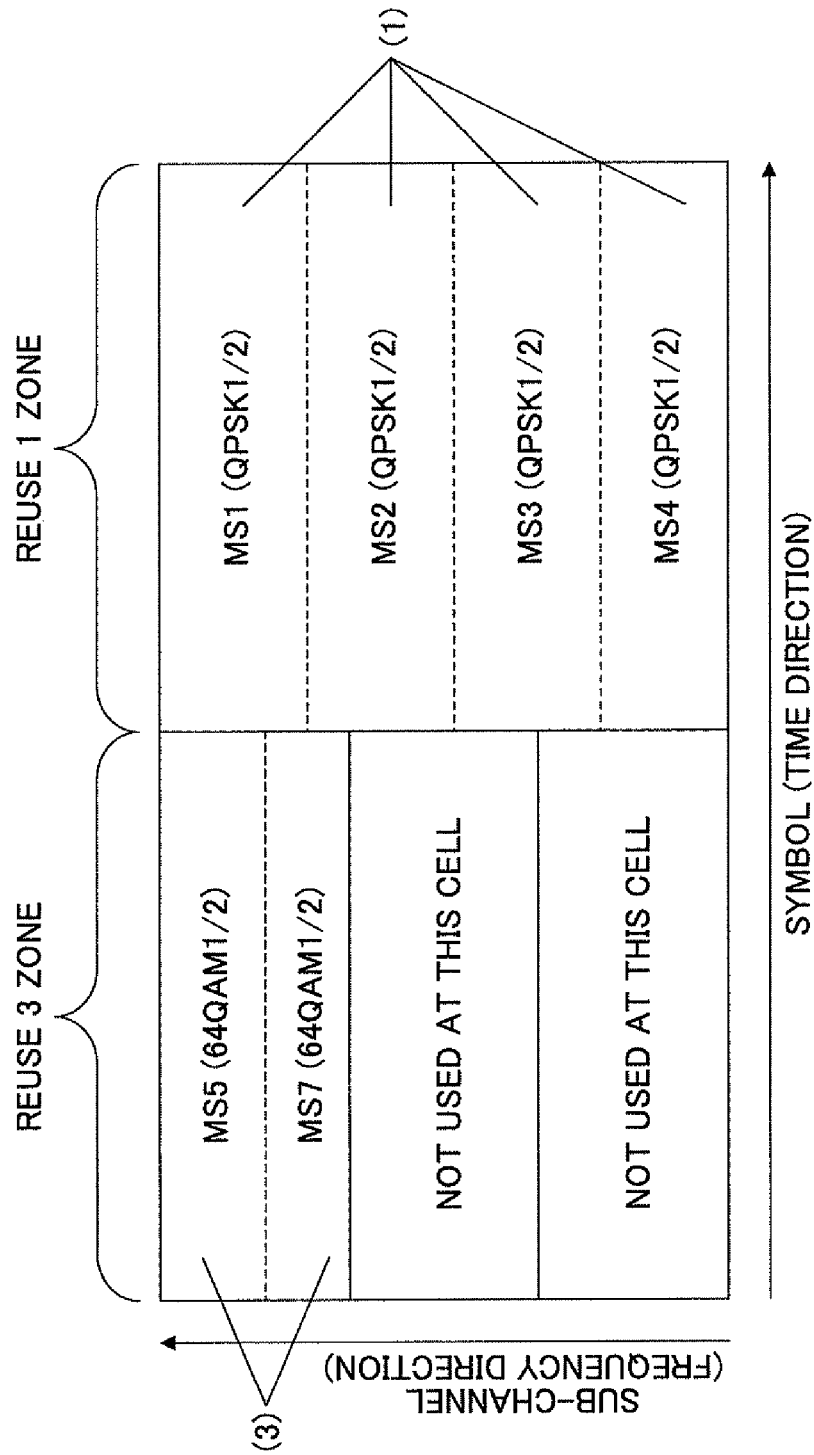
FIG. 17 is a diagram illustrating a wireless resource assignment result of an uplink sub-frame.

No Increase of Transmission Power of MS in Reuse 1 Zone, Increase of Transmission Power of MS to Maximum Transmission Power FIG. 16 illustrates a scheduling procedure according to the second embodiment of the present invention. FIG. 17 illustrates results of assigning wireless resources of an uplink sub-frame in a case of this scheduling procedure. The parenthesis in the drawing corresponds to the following description.

Similar to the first embodiment, the BS adjusts transmission power of MS1 through MS8 so that a predetermined CINR of 6 dB is attained with QPSK 1/2. By using the procedure of FIG. 13, the BS is informed of the current transmission power value of each MS in a manner illustrated in FIG. 16 (A). The BS or both BS and MS maintain correspondence data between BP and reception CINR.

As a difference with respect to the first embodiment, the BS maintains not only the current transmission power of each MS but also the maximum transmission power of each MS. Because the maximum transmission power is a fixed value based on the capability of each MS, the value may differ for each MS depending on the manufacturing vendor or type of the MS. For a MS having a large maximum transmission power, the MS can communicate in a position far from the BS to that extent. The obtaining of the maximum transmission power of the MS is described below.

(1) The BS assigns slots of Reuse 1 zone of an uplink sub-frame using QPSK 1/2 (as the BP usable with a predetermined CINR) in an order starting from the MS whose current transmission power is lowest. The BS performs slot allocation by managing the uplink data bandwidth yet to be assigned in byte units according to procedures such as bandwidth requests and calculating the necessary number of slots based on the BP to be used. In this embodiment, as illustrated in FIG. 17, slots are assigned using QPSK 1/2 to MS1 through MS4. Thus, slots of Reuse 1 zone have all been assigned.

(2) In a case where there are MS with bandwidth requests waiting for assignment, the BS selects the MS to which slots are assigned by using Reuse 3 zone. The BS determines whether a BP faster than QPSK 1/2 can be used with respect to unassigned MS5 through MS8 in a case where transmission power is increased within the maximum transmission power. In this embodiment, each MS and the usable fastest BP thereof are described below.

MS5: Because 20−8=12 dB, QPSK 1/2 is changed to 64 QAM 1/2 (increased amount: 18−6=12 dB).
MS6: Because 20−9=11 dB, QPSK 1/2 is changed to 16 QAM 1/2 (increased amount: 12−6=6 dB).
MS7: Because 30−15=15 dB, QPSK 1/2 is changed to 64 QAM 1/2 (increased amount: 18−6=12 dB).
MS8: 25−20=5 dB, QPSK 1/2 can only be used.

(3) Based on the above-determination, among MS5 through MS8, the BS assigns slots of Reuse 3 zone to MS5 and MS7 which are capable of using high speed BP with priority. Although both MS5 and MS7 can use 64 QAM 1/2, the transmission power of the MS5 is 8 (current transmission power)+12 (increased amount)=20 dBm in a case of using 64 QAM 1/2 and the transmission power of MS7 is 15 (current transmission power)+12 (increased amount)=27 dBm in a case of using 64 QAM 1/2.

In a case where there are plural MS capable of using the same BP, slots may be assigned to the MS having lower transmission power. This is because, in a case where the entire uplink throughput is the same, the MS consuming less electric power should be selected as much as possible. Alternatively, assigning may be performed based on simply the MS having a lower number or the MS having greater bandwidth requests waiting to be transmitted. In this embodiment, MS5 and MS7 are assigned with slots of Reuse 3 zone using 64 QAM 1/2 as illustrated in FIG. 17. With all slots of Reuse 3 zone having been assigned, the scheduling is completed.

Figure 18:
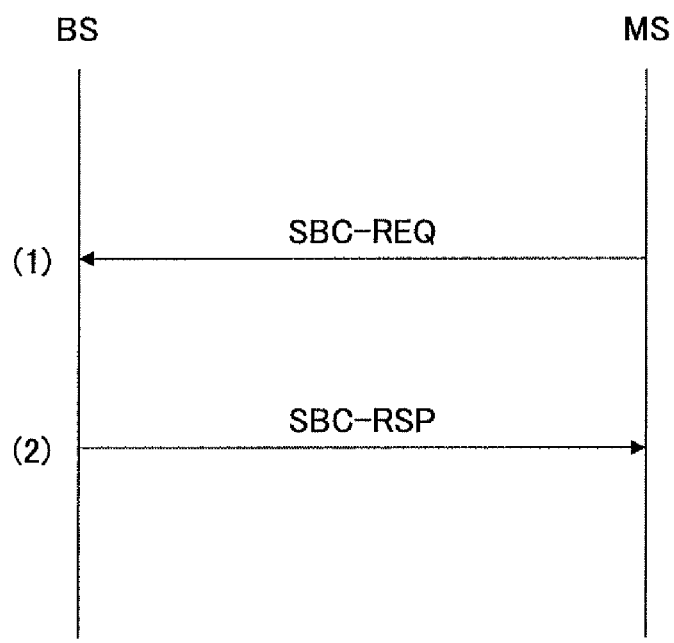
FIG. 18 is a diagram for describing a negotiation procedure.

FIG. 18 illustrates basic capability negotiation procedures for reporting data pertaining to capability of a MS and performing negotiation of parameters to be used according to IEEE 802.16d/e. The procedure of the negotiation is performed when the MS connects to a IEEE 802.16d/e network. By this procedure, the maximum transmission power of the MS can be obtained.

(1) The MS transmits a SBC-REQ message to the BS to request negotiation of a wireless parameter(s) to be used in communicating with the BS. The SBC-REQ message includes a Maximum Tx power parameter indicating maximum transmission power that can be used for transmission with respect to each modulation scheme and other parameters.

(2) The BS maintains necessary data based on the parameters included in the received SBC-REQ and reports the parameters agreed and decided to be used for communicating with the MS by using the SBC-RSP.

Flowchart of Scheduling According to First and Second Embodiments

Figure 19:
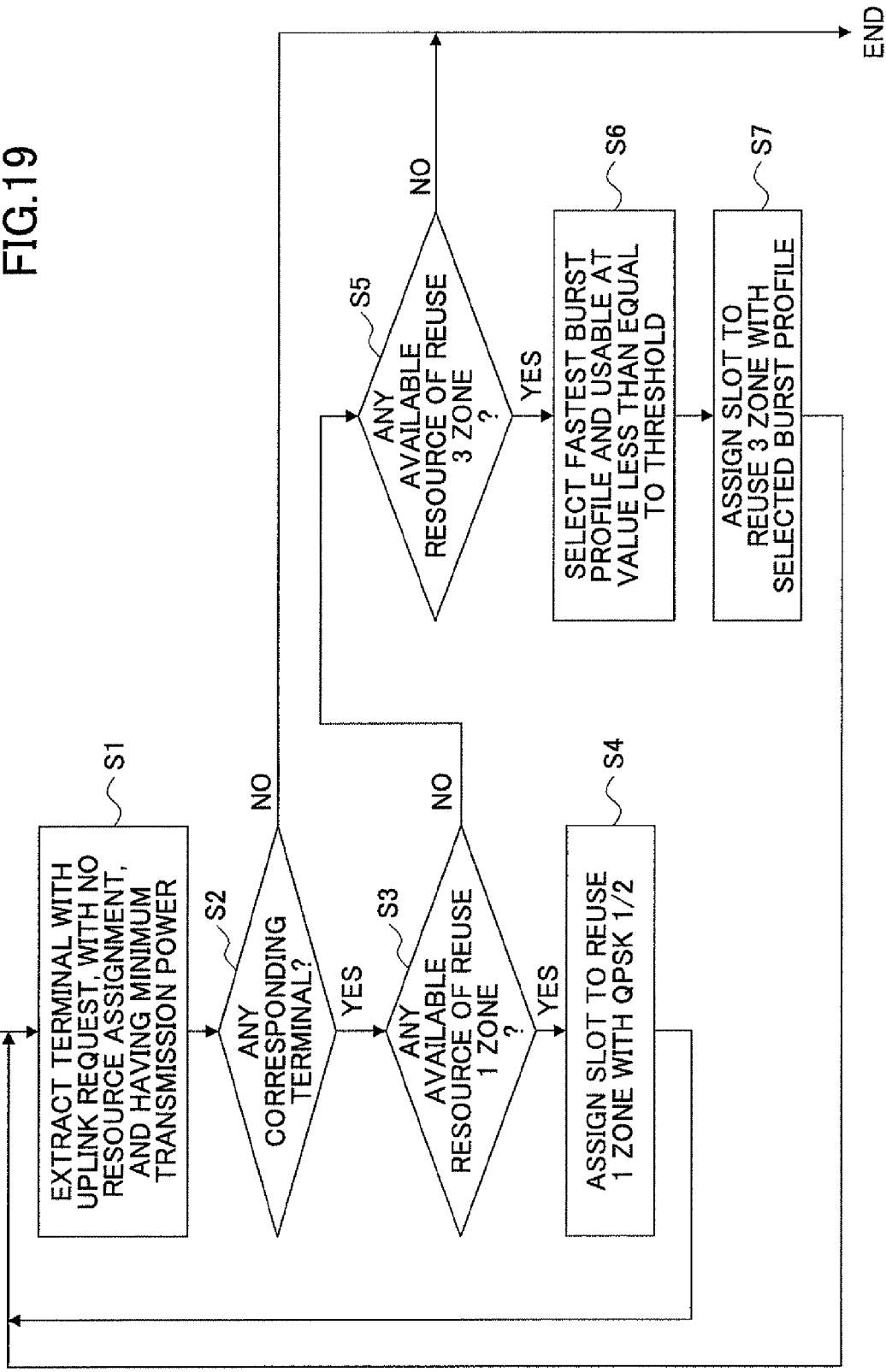
FIG. 19 is a flowchart of scheduling according to first and second embodiments of the present invention.

FIG. 19 illustrates a flowchart of scheduling according to the first and second embodiments of the present invention.

In Step S1 of FIG. 19, the MS having a bandwidth request waiting for transmission, having no slot of the uplink sub-frame assigned yet by scheming, and having the lowest current transmission power is extracted from among the MS connected to the BS.

In Step S2, it is determined whether a corresponding terminal has been extracted. In Step S3, it is determined whether there are any available resources in Reuse 1 zone.

In Step S4, assignment may be performed from a first sub-channel of the uplink sub-frame as illustrated in FIG. 15 or FIG. 17. As illustrated in FIG. 29, assignment may be performed using the same frequency and sub-channel as of Reuse 3 zone.

In a case where there are no more available resources of Reuse 1 zone in Step S3, the procedure proceeds to Step S5. In Step S5, it is determined whether there are any available resources in Reuse 3 zone. Then, in Step S6, the fastest BP is selected from the BP that can be used in a case where transmission power of the MS is increased to a value equal to or less than a predetermined threshold. The threshold of the first embodiment is the transmission power of Reuse 3 zone maintained in the BS, and the threshold of the second embodiment is the highest transmission power of each MS. Then, in Step S7, slot assignment of Reuse 3 zone is performed.

In a case where slot assignment for all MS satisfying the extraction conditions of Step S1 is performed and there are no more MS or a case where all slots of Reuse 1 zone and Reuse 3 zone are assigned, the scheduling is completed.

Figure 20:
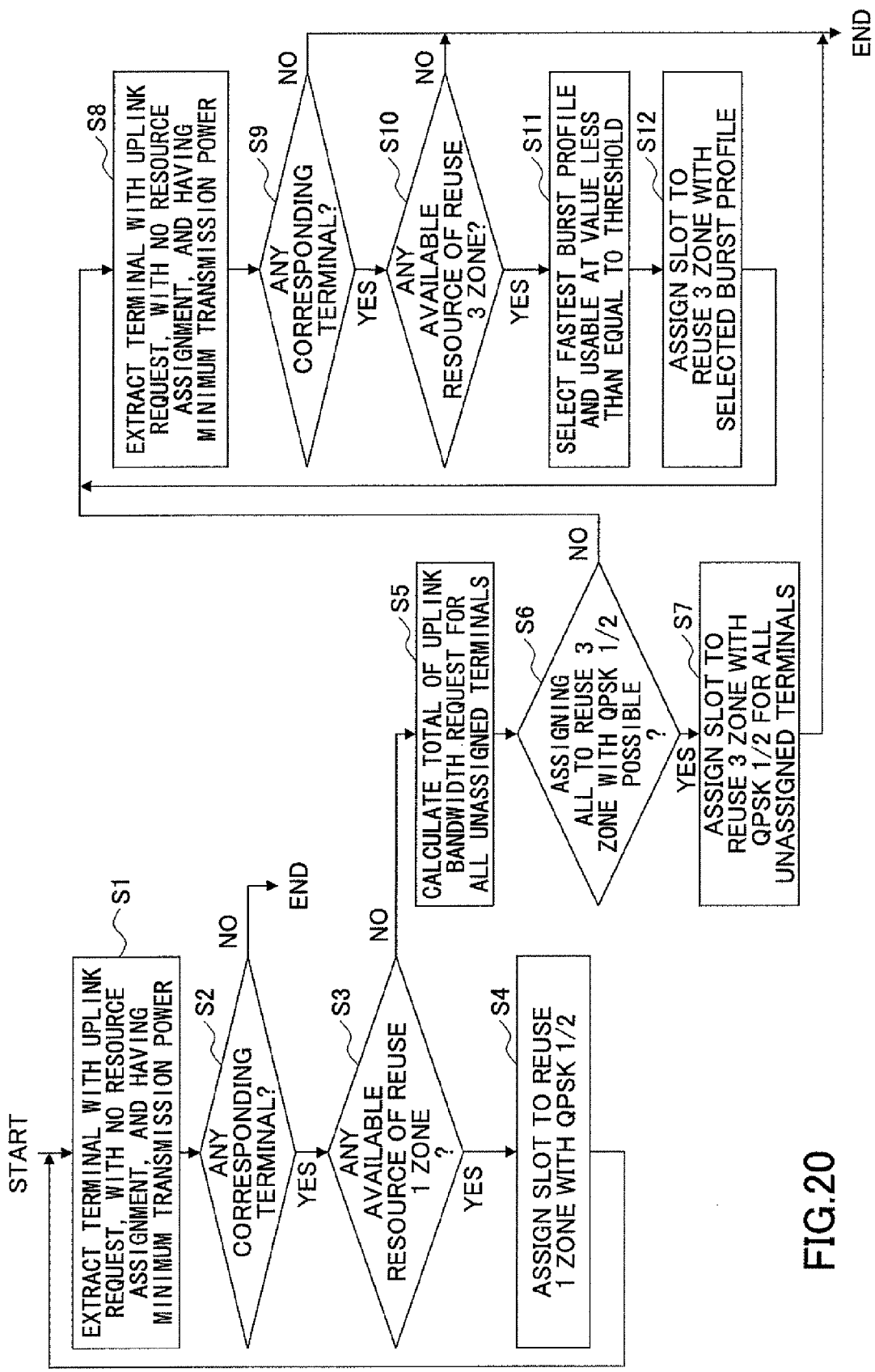
FIG. 20 is a another flowchart of scheduling according to first and second embodiments of the present invention.

FIG. 20 illustrates another flowchart of scheduling according to the first and second embodiments of the present invention.

In Step S1 through Step S4 of FIG. 20, slot assignment of Reuse 1 zone is performed in the same manner as the flow of FIG. 19.

In a case where all slots of Reuse 1 zone are assigned, slot assignment of Reuse 3 zone is performed in Step S5 through S12. First, in Step S5, the total of the waiting bandwidth request of unassigned MS is calculated. In Step S6, the total is converted into the number of slots where QPSK 1/2 is used. Then, it is determined whether the converted number of slots exceeds the number of all the slots of Reuse 3 zone.

In a case where the number of converted slots do not exceed the number of all the slots of Reuse 3 zone (determination result=Y), slots of Reuse 3 are assigned using QPSK 1/2 for all remaining unassigned MS in Step S7. Thereby, scheduling is completed. In this case, because the MS does not need to use high speed BP, uplink data can be transmitted with low transmission power, that is, low power consumption. Further, the processing load for scheduling is small for the BS. Thereby, the load of the processor can be reduced.

In a case where the number of converted slots exceed the number of all the slots of Reuse 3 zone (determination result=N), slot assignment of Reuse 3 zone is performed in Steps S8 through S12 in the same manner illustrated in FIG. 19. That is, in Step S8, the MS having a bandwidth request waiting for transmission, having no slot of the uplink sub-frame assigned yet by scheming, and having the lowest current transmission power is extracted. Then, in a case where a corresponding terminal is extracted in Step S9, Steps S10 through S12 corresponding to Steps S5 through S7 of FIG. 19 are performed.

Third Embodiment

Increase of Transmission Power of MS to Threshold in Reuse 1 Zone, Increase of Transmission Power of MS to Threshold in Reuse 3

Figure 22:
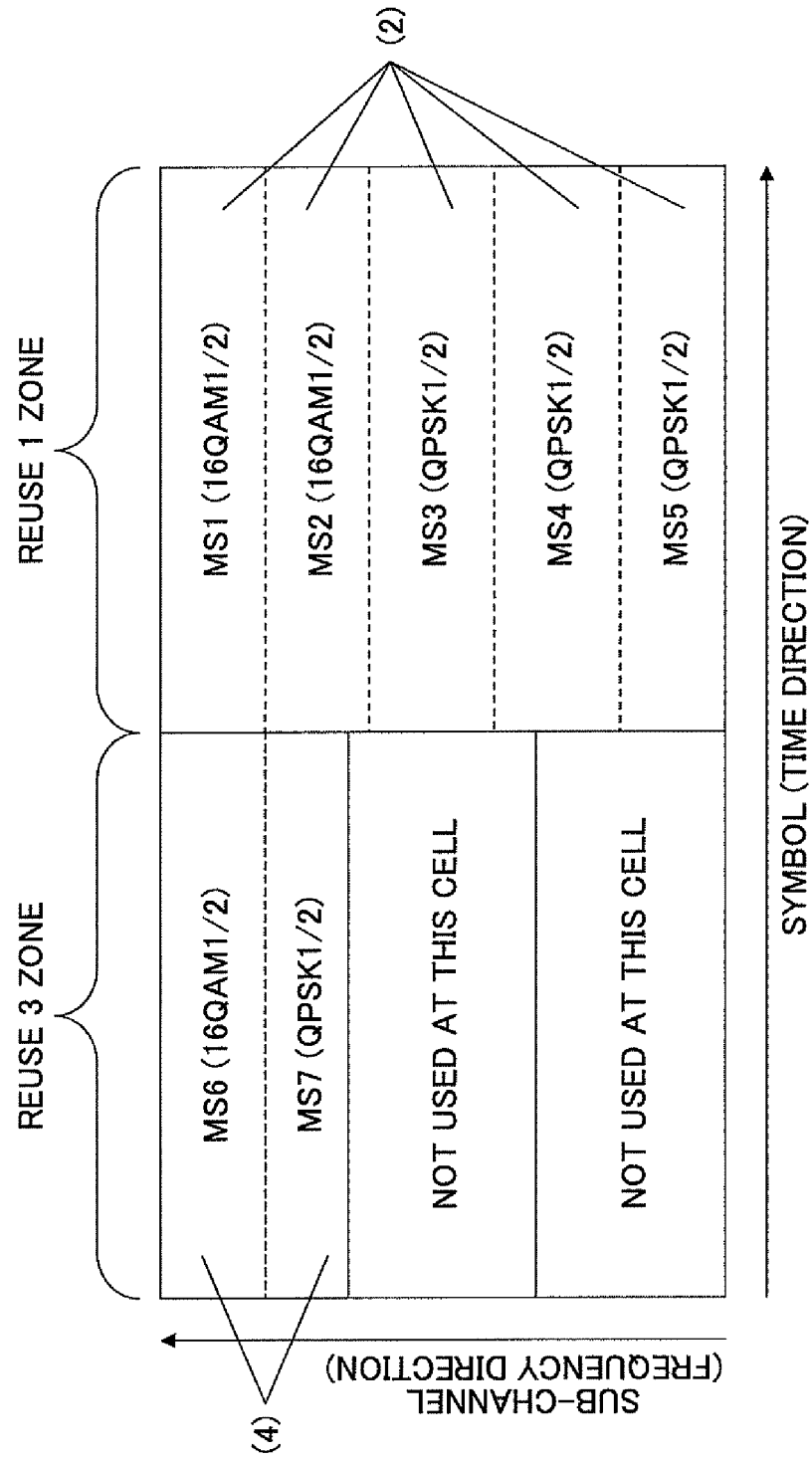
FIG. 22 is a diagram illustrating a wireless resource assignment result of an uplink sub-frame.

FIG. 21 illustrates a scheduling procedure according to a third embodiment of the present invention. FIG. 22 illustrates results of assigning wireless resources of an uplink frame in a case of this scheduling procedure. The parenthesis in the drawing corresponds to the following description.

The BS adjusts transmission power of MS1 through MS8 so that a predetermined CINR is attained with QPSK 1/2. By using the procedure of FIG. 13, the BS is informed of the current transmission power value of each MS in a manner illustrated in FIG. 21 (A). The BS or both BS and MS maintain correspondence data between BP and reception CINR in a manner as illustrated in FIG. 21 (B).

As a difference with respect to the first embodiment, the BS maintains not only the threshold of the transmission power of the MS in Reuse 3 zone but also the threshold of the transmission power of the MS in Reuse 1 zone. As described with FIG. 9, it is determined whether a faster BP is to be used even for Reuse 1 zone in a case where the transmission power does not surpass a predetermined threshold. If a predetermined condition(s) is satisfied, assigning of wireless resources is performed using a BP faster than QPSK 1/2. As illustrated in FIGS. 21(C) and 21(D), the BS maintains 10 dBm as the threshold of the transmission power of Reuse 1 zone and 20 dBm as the threshold of the transmission power of Reuse 3.

(1) The BS selects the MS to be assigned with a slot(s) using Reuse 1 zone starting from the MS whose current transmission power is lowest. In a case where transmission power in Reuse 1 zone is increased within the limit of a threshold 10 dBm, the BS determines whether a BP faster than QPSK 1/2 can be used. In this embodiment, each MS and the usable fastest BP are described below. The targets of the determination are MS1 through MS6 whose current transmission power does not exceed 10 dBm.

MS1: Because 10−3=7 dB, QPSK 1/2 is changed to 16 QAM 1/2 (increased amount: 12−6=6 dB).
MS2: Because 10−4=6 dB, QPSK 1/2 is changed to 16 QAM 1/2 (increased amount: 12−6=6 dB).
MS3: Because 10−5=5 dB, QPSK 1/2 can only be used.
MS4: Because 10−6=4 dB, QPSK 1/2 can only be used.
MS5: Because 10−8=2 dB, QPSK 1/2 can only be used.
MS6: Because 10−9=1 dB, QPSK 1/2 can only be used.

(2) Based on the above-determination, the BS uses a high speed BP as much as possible in an order starting from MS1 and assigns slots of Reuse 1 zone of the uplink sub-frame.

In this embodiment, slots are assigned using 16 QAM 1/2 to MS1 and MS2, and slots are assigned using QPSK 1/2 to MS3, MS4, and MS5 as illustrated in FIG. 22. Thus, slots of Reuse 1 zone have all been assigned.

Although MS6 is the target of the determination of (1), MS6 also becomes a candidate of slot assignment of Reuse 3 zone at (3) because assignment of the slots of Reuse 1 is completed by the assigning of slots to MS1 through MS5.

(3) In a case where there are MS with bandwidth requests waiting for assignment, the BS selects the MS to which slots are assigned by using Reuse 3 zone. The BS determines whether a BP faster than QPSK 1/2 can be used in a case where transmission power is increased within the limit of a threshold 20 dBm in an order starting from the unassigned MS6. In this embodiment, each MS and the usable fastest BP thereof are described below.

MS6: Because 20−9=11 dB, QPSK 1/2 is changed to 16 QAM 1/2 (increased amount: 12−6=6 dB).
MS7: Because 20−15=5 dB, QPSK 1/2 can only be used.
MS8: Because 20−20=0 dB, QPSK 1/2 can only be used.

(4) Based on the above-determination, the BS uses a high speed BP as much as possible in an order starting from MS6 and assigns slots of Reuse 3 zone of the uplink sub-frame.

In this embodiment, MS6 and MS7 are assigned with slots of Reuse 3 zone using 16 QAM 1/2 and QPSK 1/2 as illustrated in FIG. 22. With all slots of Reuse 3 zone having been assigned, the scheduling is completed.

Fourth Embodiment

Figure 24:
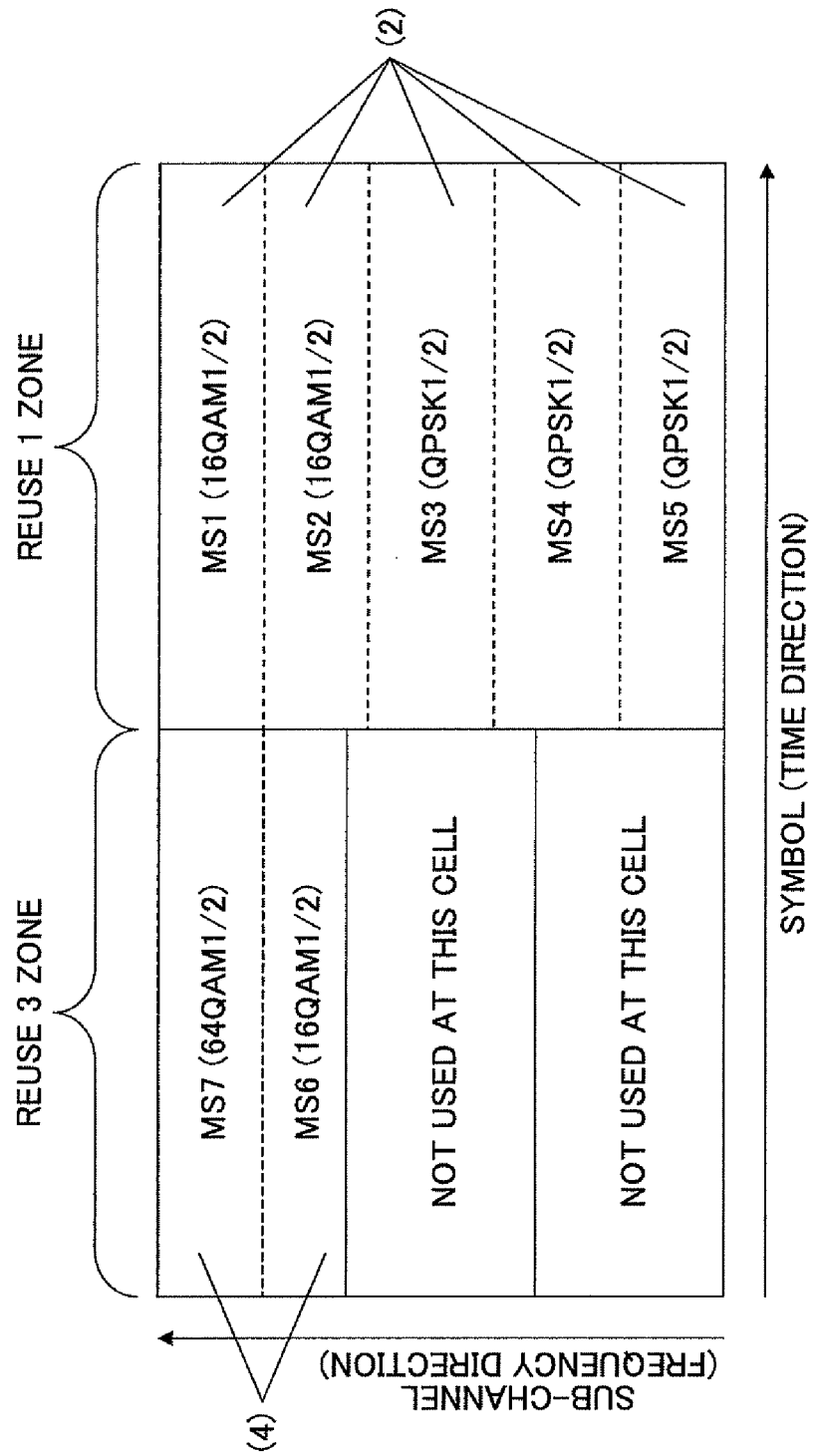
FIG. 24 is a flowchart of scheduling according to third and fourth embodiments of the present invention.

Increase of Transmission Power of MS to Threshold in Reuse 1 Zone, Increase of Transmission Power of MS to Maximum Transmission Power in Reuse 3 Zone FIG. 23 illustrates a scheduling procedure according to the fourth embodiment of the present invention. FIG. 24 illustrates results of assigning wireless resources of an uplink sub-frame in a case of this scheduling procedure. The parenthesis in the drawing corresponds to the following description.

By using the procedure of FIG. 12, the BS adjusts transmission power of MS1 through MS8 so that a predetermined CINR of 6 dB is attained with QPSK 1/2. By using the procedure of FIG. 13, the BS is informed of the current transmission power value of each MS in a manner illustrated in FIG. 23 (A). The BS or both BS and MS maintain correspondence data between BP and reception CINR.

Similar to the second embodiment, the BS maintains not only the current transmission power of each MS but also the maximum transmission power of each MS. As a difference with respect to the second embodiment, the BS maintains the threshold of the transmission power of Reuse 1 zone in addition to the maximum transmission power of the MS. As described with FIG. 9, it is determined whether a faster BP is to be used even for Reuse 1 zone in a case where the transmission power does not surpass a predetermined threshold. If a predetermined condition(s) is satisfied, assigning of wireless resources is performed using a BP faster than QPSK 1/2. As illustrated in FIG. 23 (C), the BS maintains 10 dBm as the threshold of the transmission power of Reuse 1 zone.

(1) The BS selects the MS to be assigned with a slot(s) using Reuse 1 zone starting from the MS whose current transmission power is lowest. In a case where transmission power in Reuse 1 zone is increased within the limit of a threshold 10 dBm, the BS determines whether a BP faster than QPSK 1/2 can be used. In this example, each MS and the usable fastest BP are described below. The targets of the determination are MS1 through MS6 whose current transmission power does not exceed 10 dBm.

MS1: Because 10−3=7 dB, QPSK 1/2 is changed to 16 QAM 1/2 (increased amount: 12−6=6 dB).
MS2: Because 10−4=6 dB, QPSK 1/2 is changed to 16 QAM 1/2 (increased amount: 12−6=6 dB).
MS3: Because 10−5=5 dB, QPSK 1/2 can only be used.
MS4: Because 10−6=4 dB, QPSK 1/2 can only be used.
MS5: Because 10−8=2 dB, QPSK 1/2 can only be used.
MS6: Because 10−9=1 dB, QPSK 1/2 can only be used.

(2) Based on the above-determination, the BS uses a high speed BP as much as possible in an order starting from MS1 and assigns slots of Reuse 1 zone of the uplink sub-frame. In this example, slots are assigned using 16 QAM 1/2 to MS1 and MS2, and slots are assigned using QPSK 1/2 to MS3, MS4, and MS5 as illustrated in FIG. 24. Thus, slots of Reuse 1 zone have all been assigned.

Although MS6 is the target of the determination of (1), MS6 becomes a candidate of slot assignment of Reuse 3 zone again in (3) because assignment of the slots of Reuse 1 is completed by the assigning of slots to MS1 through MS5.

(3) In a case where there are MS with bandwidth requests waiting for assignment, the BS selects the MS to which slots are assigned by using Reuse 3 zone. The BS determines whether a BP faster than QPSK 1/2 can be used in a case where transmission power is increased within the maximum transmission power of each MS. In this example, the usable fastest BP for each MS is described below.

MS6: Because 20−9=11 dB, QPSK 1/2 is changed to 16 QAM 1/2 (increased amount: 12−6=6 dB).
MS7: Because 30−15=15 dB, QPSK 1/2 is changed to 64 QAM 1/2 (increased amount: 18−6=12 dB).
MS8: 25−20=5 dB, QPSK 1/2 can only be used.

(4) Based on the above-determination, among MS6 through MS8, the BS assigns slots of Reuse 3 zone to MS7 and MS6 which are capable of using high speed BP with priority. In this example, MS7 and MS6 are assigned with slots of Reuse 3 zone using 64 QAM 1/2 and 16 QAM 1/2 as illustrated in FIG. 24. With all slots of Reuse 3 zone having been assigned, the scheduling is completed.

Flowchart of Scheduling According to Third and Fourth Embodiments

Figure 25:
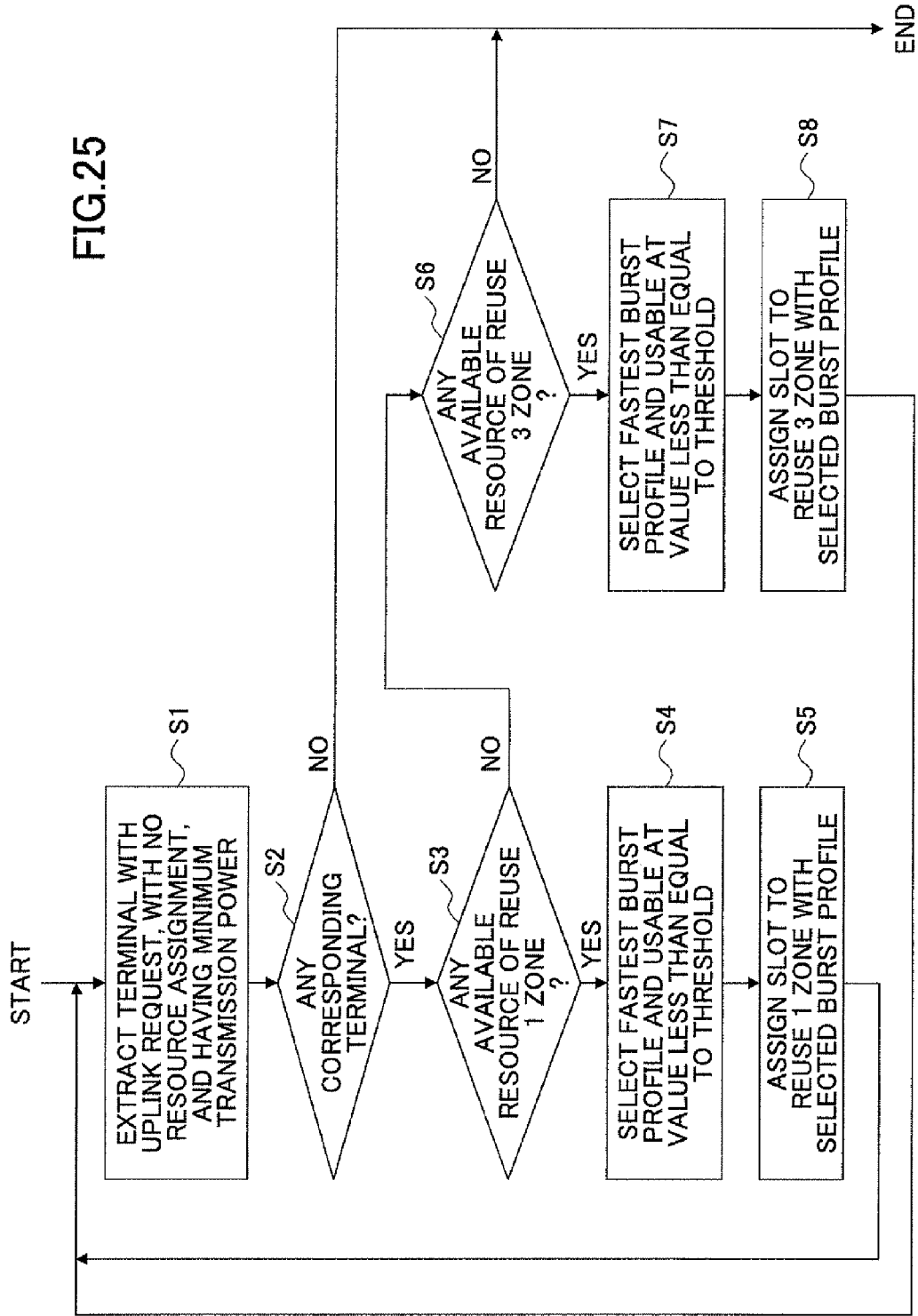
FIG. 25 is a diagram illustrating a relationship between multi-value phase modulation and gate voltage and transmission power in symbol units.

FIG. 25 illustrates a flowchart of scheduling according to the third and fourth embodiments of the present invention.

In FIG. 25, slot assignment of Reuse 1 zone is performed with Steps S1 through S5. The difference with FIG. 19 is that the fastest BP is selected from among the usable BP and assigned with a slot(s) of Reuse 1 zone in a case where the transmission power of the MS is increased to a value equal to or less than a threshold of Reuse 1 zone.

Then, slot assignment of Reuse 3 zone is performed with Steps S6 through S8. In Step S6, among the usable BP, the fastest BP is selected in a case where the transmission power of the MS is increased to a value equal to or less than a predetermined threshold. In the third embodiment, this threshold is a threshold of the transmission power in Reuse 3 zone maintained in the BS. In the fourth embodiment, this threshold is the maximum transmission power of each MS.

Slot assignment is performed for all MS satisfying the extraction conditions of Step S1. In a case where there are no more corresponding MS or in a case where all slots of Reuse 1 zone and Reuse 3 zone have been assigned, the scheduling is completed.

Figure 26:
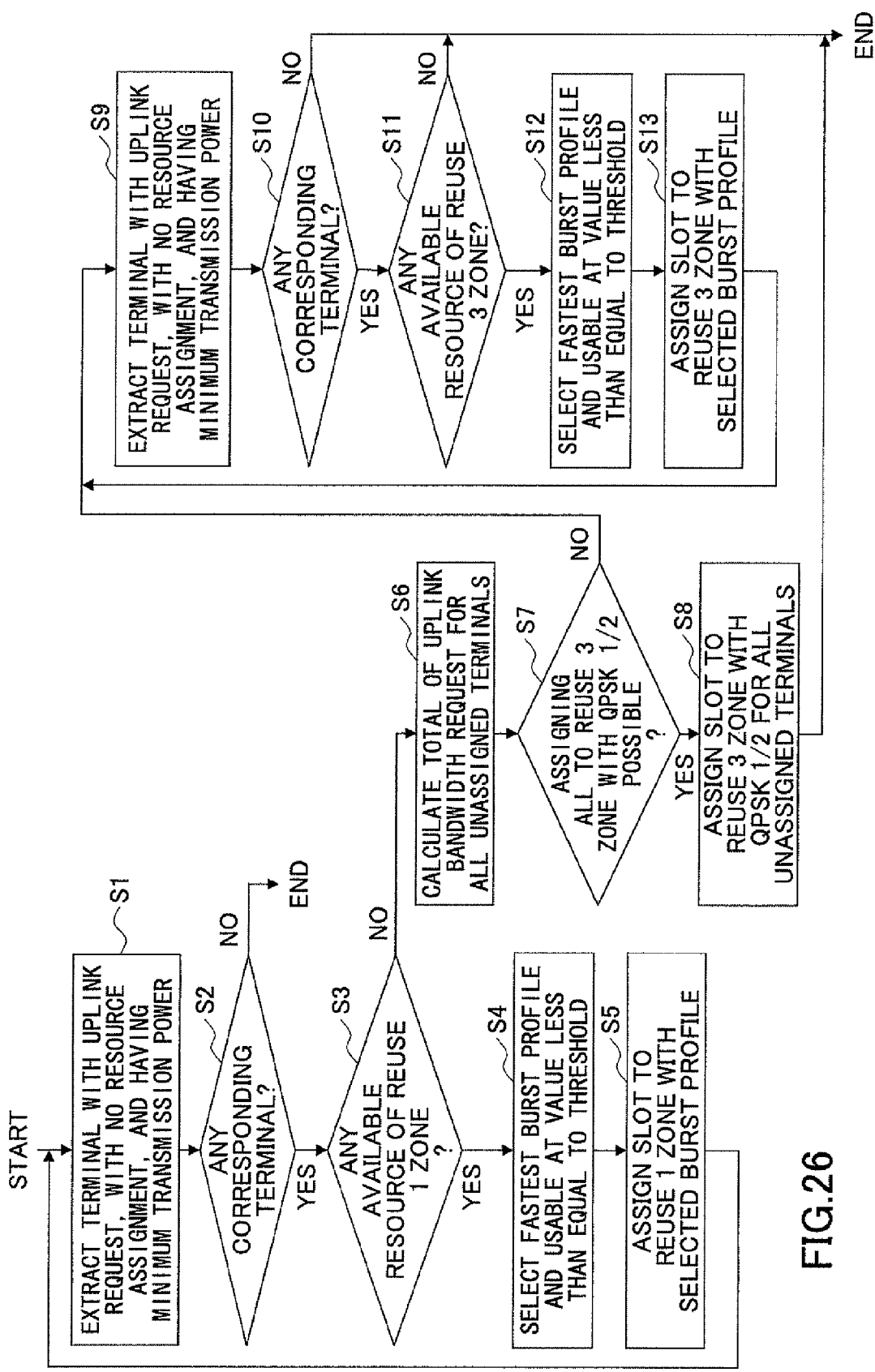
FIG. 26 is another flowchart of scheduling according to third and fourth embodiments of the present invention.

FIG. 26 illustrates another flowchart of scheduling according to the third and fourth embodiments of the present invention.

Similar to the flow of FIG. 25, slot assignment of Reuse 1 zone is performed in Steps S1 through S5 in FIG. 26.

In a case where all slots of Reuse 1 zone have been assigned, slot assignment of Reuse 3 zone is performed in Steps S6 through S13. First, in Step S6, the total of the waiting bandwidth request of unassigned MS is calculated. In Step S7, the total is converted into the number of slots where QPSK 1/2 is used. Then, it is determined whether the converted number of slots exceeds the number of all the slots of Reuse 3 zone.

In a case where the number of converted slots do not exceed the number of all the slots of Reuse 3 zone (determination result=Y), slots of Reuse 3 are assigned using QPSK 1/2 for all remaining unassigned MS in Step S8. Thereby, scheduling is completed. In this case, because the MS does not need to use high speed BP, uplink data can be transmitted with low transmission power, that is, low power consumption. Further, load for scheduling is small for the BS. Thereby, the workload of the processor can be reduced.

In a case where the number of converted slots exceed the number of all the slots of Reuse 3 zone (determination result=N), slot assignment of Reuse 3 zone is performed in Steps S9 through S13 in the same manner illustrated in FIG. 25. That is, in Step S9, the MS having a bandwidth request waiting for transmission, having no slot of the uplink sub-frame assigned yet, and having the lowest current transmission power is extracted. Then, in a case where a corresponding terminal is extracted in Step S10, Steps S11 through S13 corresponding to Steps S6 through S8 of FIG. 25 are performed.

Modified Example of Flowchart

Figure 27:
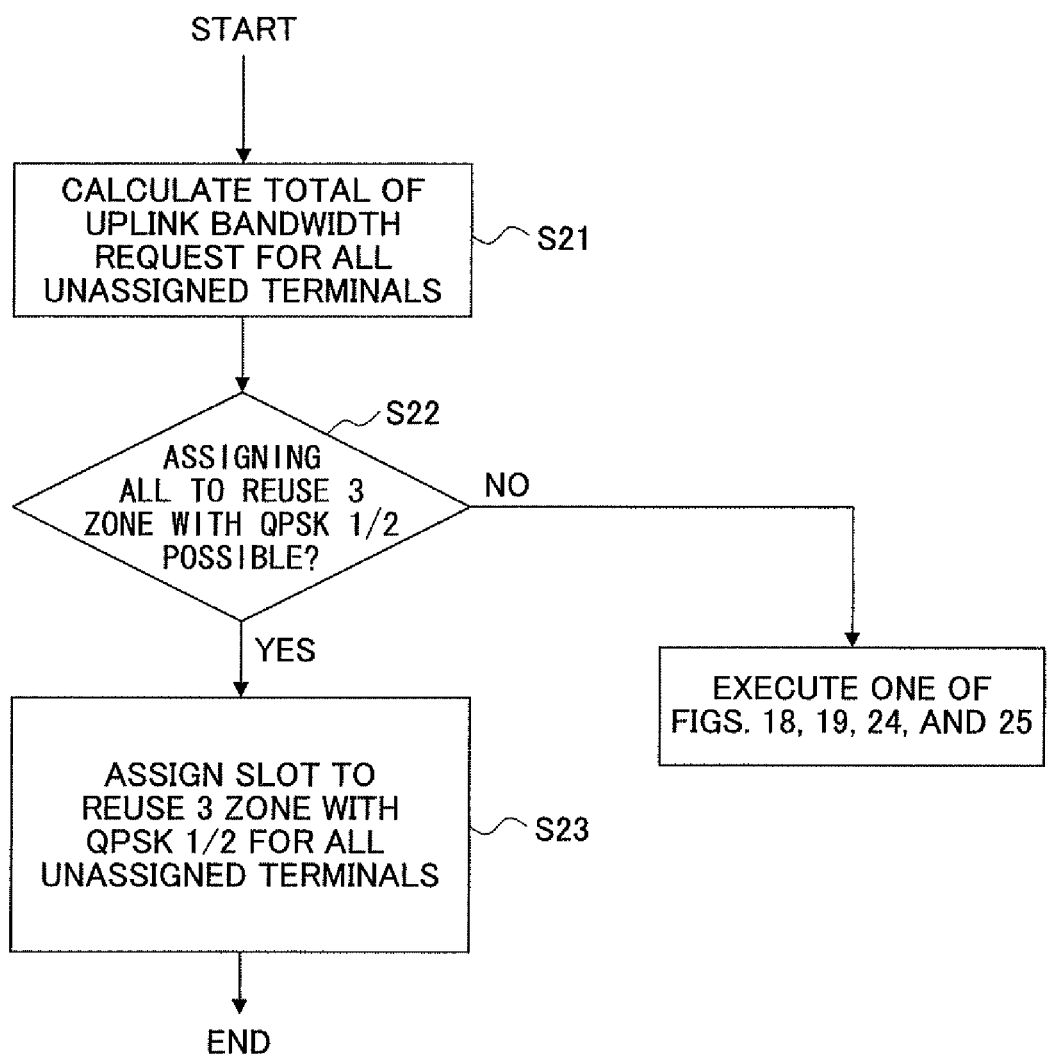
FIG. 27 is a modified example of a flowchart of scheduling according to the first through fourth embodiments of the present invention.

FIG. 27 is a modified example illustrating a flowchart of the scheduling of the first through fourth embodiments of the present invention. In Steps S5 through S7 of FIG. 20 and Steps S6 through S8 of FIG. 26, it is determined whether slot assignment of Reuse 3 zone can be performed for all unassigned MS having bandwidth requests with QPSK 1/2 before performing the slot assignment of Reuse 3 zone. In FIG. 27, the determination is performed before slot assignment of Reuse 1 zone of FIGS. 19, 20, 25, and 26.

In Step S21 of FIG. 27, the total of all waiting bandwidth requests of unassigned MS is calculated prior to assigning of slots. In Step S22, the total is converted into the number of slots where QPSK 1/2 is used. Then, it is determined whether the converted number of slots exceeds the number of all the slots of Reuse 3 zone.

In a case where the number of converted slots do not exceed the number of all the slots of Reuse 3 zone (determination result=Y), slots of Reuse 3 are assigned using QPSK 1/2 for all MS in Step S23. Thereby, scheduling is completed.

In a case where the number of converted slots exceed the number of all the slots of Reuse 3 zone (determination result=N), the flowchart of one of FIGS. 19, 20, 25, and 26 is executed, so that slot assignment of Reuse 1 zone is started.

Since it is considered that the number of slots of Reuse 3 zone is small compared to that of Reuse 1 zone, scheduling does not need to be ended by merely performing the Steps S21 through S23 unless, for example, the communicating MS is so few that the total of transmission waiting bandwidth requests is small. However, by using the flowchart of FIG. 27, even in a case of using FFR, slot assignment using only Reuse 3 zone can be performed in a case where slots can be assigned to all waiting bandwidth requests by using only Reuse 3 zone. By using only Reuse 3 zone, there will be less interference among cells. Further, the workload of the processor is reduced because the amount of process load for scheduling by the BS can be reduced.

Figure 28:
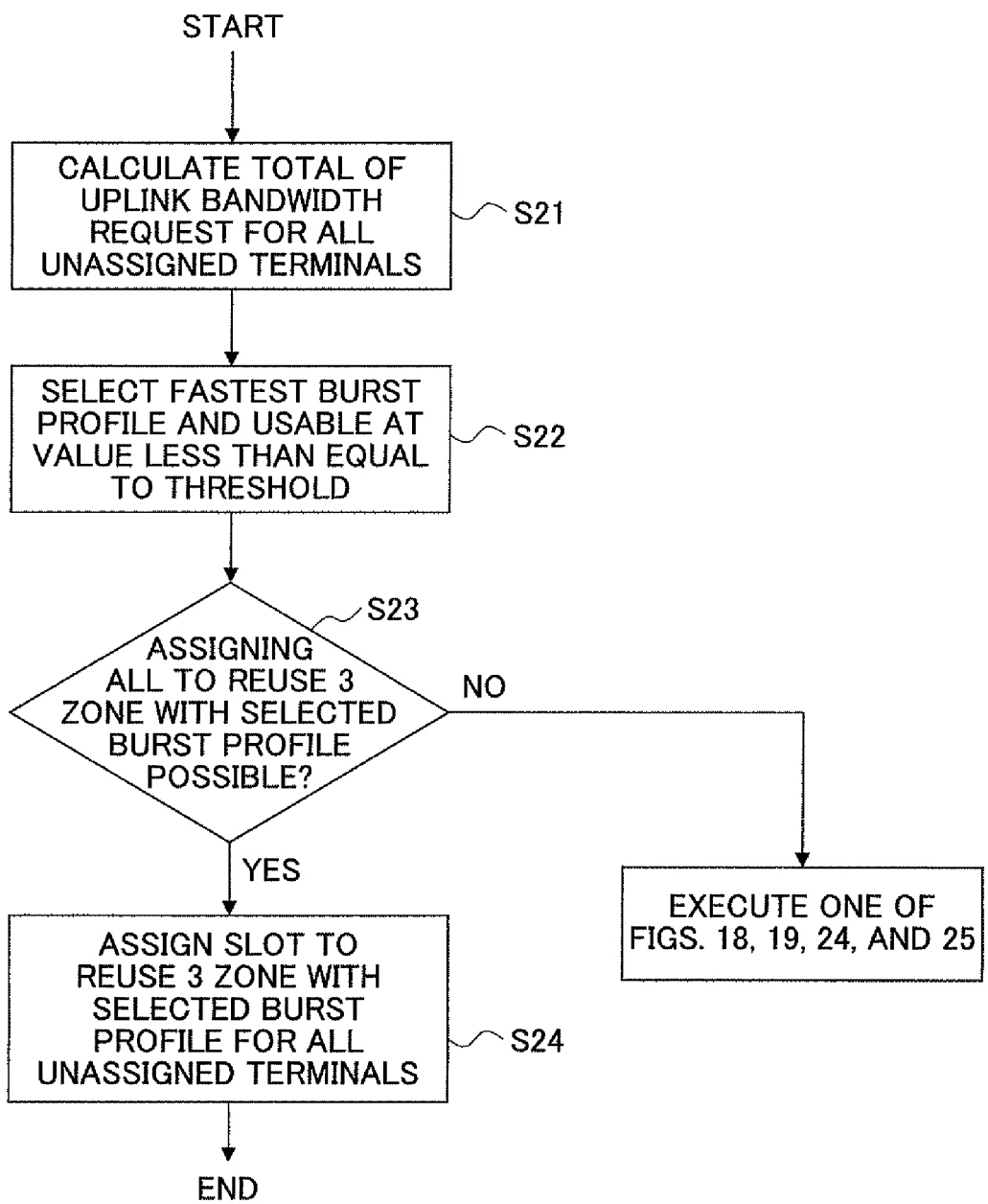
FIG. 28 is another modified example of a flowchart of scheduling according to the first through fourth embodiments of the present invention.

FIG. 28 is another modified example illustrating a flowchart of the scheduling of the first through fourth embodiments of the present invention. Similar to FIG. 27, it is determined whether slot assignment of Reuse 3 zone can be performed for all unassigned MS having bandwidth requests before performing the slot assignment of Reuse 1 zone according to FIGS. 19, 20, 25, and 26.

The difference between FIG. 27 is that in Step S22 of FIG. 28, the usable fastest BP is selected in a case where the transmission power is increased to a threshold of Reuse 3 zone or equal to or less than the maximum transmission power of the MS rather the QPSK 1/2. In Step S23, the BP selected in Step S22 is converted into the number of slots where the selected BP in Step S22 is used. Then, it is determined whether the converted number of slots exceeds the number of all the slots of Reuse 3 zone. In a case where the number of converted slots does not exceed the number of all the slots of Reuse 3 zone, slots of Reuse 3 are assigned using the BP selected in Step S22 to all MS in Step S24.

Because necessary slots become fewer by using high speed BP, compared to using QPSK 1/2 to all MS as in FIG. 27, the percentage of being able to perform assignment using only Reuse 3 zone becomes higher even in a case where the number of slots of Reuse 3 zone is small. However, compared to the case of FIG. 27, the transmission power of the MS using high speed BP (i.e. power consumption) increases. Thereby, the amount of process load for scheduling by the BS increases.

Modified Example of Slot Assigning Method in
Reuse 1 Zone

FIG. 29 illustrates a modified example of a slot assigning method in Reuse 1 zone of an uplink sub-frame according to the first through fourth embodiments of the present invention. The horizontal axis of each uplink sub-frame indicates a symbol, and the vertical axis of each uplink sub-frame indicates a sub-channel.

In each uplink sub-frame, the right half corresponds to Reuse 1 zone and the left half corresponds to Reuse 3 zone. In Reuse 3 zone, cell 1, cell 2, and cell 3 exclusively use an F1 part, an F2 part, and a F3 part of the sub-channel, respectively. In Reuse 1 zone, cell 1, cell 2, and cell 2 share all of F1, F2, F3 of the sub-channel.

As described with FIGS. 15, 17, 22, and 24, slots of Reuse 1 zone are normally assigned by allowing the same sub-channel to be used regardless of the cell in an order starting from, for example, a sub-channel having the lowest index (topmost sub-channel in the drawing).

Next, in a case where the number of slots of Reuse 1 zone assigned to cells 1, 2, and 3 are, for example, approximately 1/3 of the entire number of slots of Reuse 1 zone, it is preferable to assign slots so that the sub-channel used in Reuse 1 zone can be exclusively used because interference among cells may be prevented even for Reuse 1 zone in a manner similar to Reuse 3 zone.

Even if the number of slots assigned to Reuse 1 zone is greater than 1/3 of the entire number of slots, it is preferable to assign slots in an exclusive order because it leads to reduction of the possibility of the same sub-channel being used by adjacent cells (i.e. possibility of generation of interference).

Therefore, as illustrated in FIG. 29(A), cell 1, for example, starts slot assignment from a frequency of a portion (1) corresponding to F1 used in Reuse 3; then, performs slot assignment from a frequency of a portion (2) corresponding to F2; and lastly, performs slot assignment from a frequency of a portion (3) corresponding to F3.

Further, cell 2, as illustrated in FIG. 29 (B) starts slot assignment from a frequency of a portion (2) corresponding to F2 used in Reuse 3; then, performs slot assignment from a frequency of a portion (3) corresponding to F3; and lastly, performs slot assignment from a frequency of a portion (1) corresponding to F1.

Further, cell 3, as illustrated in FIG. 29 (C) starts slot assignment from a frequency of a portion (3) corresponding to F3 used in Reuse 3 zone; then, performs slot assignment from a frequency of a portion (1) corresponding to F1; and lastly, performs slot assignment from a frequency of a portion (2) corresponding to F2.

With the above-described embodiments of the present invention, interference among adjacent cells can be prevented by applying FFR to an uplink while assigning appropriate wireless resources of Reuse 1 zone or Reuse 3 zone by selecting high speed BP as much as possible for the MS. Thereby, the total amount of uplink data that can be transmitted by the entire cells (i.e. throughput of uplink) can be improved without reception error due to interference.

In the above-described embodiments of the present invention, the transmission power of the MS in Reuse 3 zone or both Reuse 1 zone and Reuse 3 zone is increased to a predetermined threshold or to a maximum transmission of the MS. Alternatively, however, the transmission power of the MS in only Reuse 1 zone may be increased to a predetermined threshold or to a maximum transmission of the MS.

With the above-described scheduling method according to an embodiment of the present invention, generation of interference can be prevented in consideration of transmission power of wireless terminals. Moreover, improvement of throughput can be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless base station located in a cell that is adjacent to a cell of another wireless base station, the wireless base station comprising:
   a wireless interface that performs wireless communication with a wireless mobile station by using a first frequency bandwidth different from the another wireless base station in a first time period and using a second frequency bandwidth shared with the another wireless base station in a second time period; and
   a control unit that assigns a same burst profile as a burst profile applied to an uplink transmission with respect to the wireless mobile station in the first time period, or assigns a burst profile having a wireless transmission rate equal to or less than a wireless transmission rate of the burst profile applied to the uplink transmission with respect to the wireless mobile station in the first time period.

2. The wireless base station as claimed in claim 1,
   wherein the first time period is a frequency reuse zone in which available frequencies are divided in correspondence with the number of a plurality of cells and are exclusively used by each of the plurality of cells,
   wherein the second time period is another frequency reuse zone in which the available frequencies can be shared by the plurality of cells.

3. A wireless base station located in a cell that is adjacent to a cell of another wireless base station, the wireless base station comprising:
   a wireless interface that performs wireless communication with a wireless mobile station by using a first frequency bandwidth different from the another wireless base station in a first time period and using a second frequency bandwidth shared with the another wireless base station in a second time period; and
   a control unit that controls a maximum wireless communication rate of an uplink transmission burst profile permitted to be assigned to the wireless mobile station in the first time period to a rate that is lower than a maximum wireless communication rate of an uplink transmission burst profile permitted to be assigned to the wireless mobile station in the second time period.

4. The wireless base station as claimed in claim 3,
   wherein the first time period is a frequency reuse zone in which available frequencies are divided in correspondence with the number of a plurality of cells and are exclusively used by each of the plurality of cells,
   wherein the second time period is another frequency reuse zone in which the available frequencies can be shared by the plurality of cells.

5. A wireless base station located in a cell that is adjacent to a cell of another wireless base station, the wireless base station comprising:
   a wireless interface that performs wireless communication with a wireless mobile station by using a first frequency bandwidth different from the another wireless base station in a first time period and using a second frequency bandwidth shared with the another wireless base station in a second time period; and
   a control unit that controls an uplink burst profile permitted to be assigned to the wireless mobile station in the first time period to a rate that is equal to or less than a downlink burst profile,
   wherein the uplink burst profile is a transmission parameter indicating a combination of a modulation scheme and an encoding scheme used for transmitting uplink data.

6. The wireless base station as claimed in claim 5,
   wherein the first time period is a frequency reuse zone in which available frequencies are divided in correspondence with the number of a plurality of cells and are exclusively used by each of the plurality of cells,
   wherein the second time period is another frequency reuse zone in which the available frequencies can be shared by the plurality of cells.

7. A wireless base station located in a cell that is adjacent to a cell of another wireless base station, the wireless base station comprising:
   a wireless interface that performs wireless communication with a wireless mobile station by using a first frequency bandwidth different from the another wireless base station in a first time period and using a second frequency bandwidth shared with the another wireless base station in a second time period; and
   a control unit that regulates increase of transmission power or regulates transmission power to be equal to or less than a predetermined transmission power lower than a maximum transmission power with respect to the wireless mobile station in the first time period.

8. The wireless base station as claimed in claim 7,
   wherein the first time period is a frequency reuse zone in which available frequencies are divided in correspondence with the number of a plurality of cells and are exclusively used by each of the plurality of cells,
   wherein the second time period is another frequency reuse zone in which the available frequencies can be shared by the plurality of cells.

9. A wireless base station located in a cell that is adjacent to a cell of another wireless base station and included in a wireless communication system together with a plurality of wireless mobile stations, the wireless base station comprising:
   a wireless interface that performs wireless communication with the plurality of wireless mobile stations by using a first frequency bandwidth different from the another wireless base station in a first time period and using a second frequency bandwidth shared with the another wireless base station in a second time period;

a first assigning unit that assigns a first wireless resource using the second frequency bandwidth to any of the plurality of wireless mobile stations in the second time period;

a second assigning unit that assigns a second wireless resource using the first frequency bandwidth to a wireless mobile station that has not been assigned the first wireless resource in the second time period;

a controlling unit for controlling a first transmission power to each of the plurality of wireless mobile stations so that wireless signals transmitted to the plurality of wireless mobile stations are received with a predetermined quality by using a first transmission parameter including a burst profile indicating a combination of a modulation scheme and an encoding scheme; and a determining unit for determining whether usage of a high speed second transmission parameter having a communication rate faster than the first transmission parameter is possible for a second transmission power equal to or less than a threshold with respect to each of the plural wireless mobile stations;

wherein at least one of the first assigning unit and the second assigning unit assigns the first wireless resource using the first transmission parameter and the first transmission power or the second wireless resource using the second transmission parameter and the second transmission power to each of the plurality of wireless mobile stations based on a determination result of the determining unit, wherein the burst profile is a transmission parameter indicating the combination of the modulation scheme and the encoding scheme used for transmitting data.

10. The wireless base station as claimed in claim 9, wherein the first assigning unit assigns the first wireless resource using the first transmission parameter and the first transmission power in an order of the wireless mobile station having a lower first transmission power, wherein the second assigning unit assigns the second wireless resource using the first transmission parameter and the first transmission power or the second transmission parameter and the second transmission power to a wireless mobile station of the plural wireless mobile stations that has not been assigned the first wireless resource in an order of the wireless mobile station having a lower first transmission power based on a determination result by the determining unit.

11. The wireless base station as claimed in claim 10, wherein the first assigning unit assigns the second wireless resource using the first transmission parameter and the first transmission power or the second transmission parameter and the second transmission power in an order of the wireless mobile station having a lower first transmission power based on a determination result of the determining unit, wherein the second assigning unit assigns the second wireless resource using the first transmission parameter and the first transmission power or the second transmission parameter and the second transmission power to a wireless mobile station that has not been assigned the first wireless resource in an order of the wireless mobile station having a lower first transmission power based on a determination result of the determining unit.

12. The wireless base station as claimed in claim 9, wherein a threshold of transmission power of the determining unit is a predetermined fixed value.

13. The wireless base station as claimed in claim 9, further comprising:

an obtaining unit that obtains a maximum transmission power of each of the plural wireless mobile stations, wherein the threshold of the transmission power is a maximum transmission power of each wireless mobile station.

14. The wireless base station as claimed in claim 9, wherein, among the first wireless resource, the first assigning unit assigns the same frequency as the frequency exclusively used in the second wireless resource with priority.

15. The wireless base station as claimed in claim 9, wherein the second assigning unit determines whether assignment of the second wireless resource using the first transmission parameter is possible with respect to all of the plural wireless mobile stations that have not been assigned with the first wireless resource, wherein the second wireless resource is assigned using the first transmission parameter and the first transmission power with respect to all wireless mobile stations that have not been assigned the first wireless resource when determined possible.

16. The wireless base station as claimed in claim 9, further comprising:

an assignment determining unit that determines whether assignment of the second wireless resource using the first transmission parameter with respect to all of the plural wireless mobile stations before assigning the first wireless resource with the first assigning unit, wherein the second wireless resource is assigned using the first transmission parameter and the first transmission power with respect to the plural wireless mobile stations when determined possible by the assignment determining unit.

17. The wireless base station as claimed in claim 9, further comprising:

an assignment determining unit that determines whether assignment of the second wireless resource using the second transmission parameter with respect to all of the plural wireless mobile stations before assigning the first wireless resource with the first assigning unit, wherein the second wireless resource is assigned using the second transmission parameter and the second transmission power with respect to the plural wireless mobile stations when determined possible by the assignment determining unit.

18. The wireless base station as claimed in claim 9, wherein the first time period is a frequency reuse zone in which available frequencies are divided in correspondence with the number of a plurality of cells and are exclusively used by each of the plurality of cells, wherein the second time period is another frequency reuse zone in which the available frequencies can be shared by the plurality of cells.

* * * * *